United States Patent [19]
Suzuki et al.

[11] Patent Number: 5,983,158
[45] Date of Patent: Nov. 9, 1999

[54] NAVIGATION SYSTEM FOR VEHICLES

[75] Inventors: Yukiyoshi Suzuki; Kyomi Morimoto; Mitsuhiro Nimura; Yasunobu Ito; Kazuteru Maekawa, all of Anjo, Japan

[73] Assignee: Aisin AW Co., Ltd., Anjo, Japan

[21] Appl. No.: 08/708,970

[22] Filed: Sep. 6, 1996

[30] Foreign Application Priority Data

| Sep. 8, 1995 | [JP] | Japan | 7-231228 |
| Sep. 27, 1995 | [JP] | Japan | 7-249225 |
| Oct. 27, 1995 | [JP] | Japan | 7-303621 |

[51] Int. Cl.$^6$ .............................................. G06F 165/00
[52] U.S. Cl. .................... 701/209; 701/207; 701/210; 701/211; 340/988
[58] Field of Search .................... 701/200, 207, 701/208, 209, 201, 202, 210, 211, 212; 340/988, 990, 995; 342/457; 345/418

[56] References Cited

U.S. PATENT DOCUMENTS

| 5,031,104 | 7/1991 | Ikeda et al. | 701/209 |
| 5,289,195 | 2/1994 | Inoue | 701/208 |
| 5,365,449 | 11/1994 | Kashiwazaki | 701/208 |
| 5,369,588 | 11/1994 | Hayami et al. | 701/209 |
| 5,406,491 | 4/1995 | Lima | 701/210 |
| 5,568,390 | 10/1996 | Hirota et al. | 701/201 |
| 5,608,635 | 3/1997 | Tamai | 701/209 |
| 5,832,406 | 11/1998 | Iwami et al. | 701/202 |

FOREIGN PATENT DOCUMENTS

| 0 672 892 A1 | 9/1995 | European Pat. Off. |
| 27 27 311 | 12/1978 | Germany |

Primary Examiner—Jacques H. Louis-Jacques
Assistant Examiner—Gertrude Arthur
Attorney, Agent, or Firm—Oliff & Berridge, PLC

[57] ABSTRACT

A navigation system including a present-position sensing system for sensing a present position; information storage medium for storing map information; an input device for entering into the system the destination, a roundabout point, a bypass, and the location desired to be traversed for entry of input indicating the execution of a route search from the present position sensed by the present-position sensing system to the destination; an output device for outputting information route guidance; and a central processing unit including a route searching capability for searching for a route to the destination; a route storage capability for provisionally storing the identified route; and route guidance control for sending a signal for performing route guidance to the output device. When the roundabout point or bypass is entered in the system, a search cost for roads and intersections near to the roundabout point or bypass is raised so that route search processing can be performed. When the location desired to be traversed is set, roads near to the location desired to be traversed are retrieved for search purposes. In travel guidance, a present-position mark is displayed in either a continuous mode or a blinking mode depending on the state of travel.

20 Claims, 37 Drawing Sheets

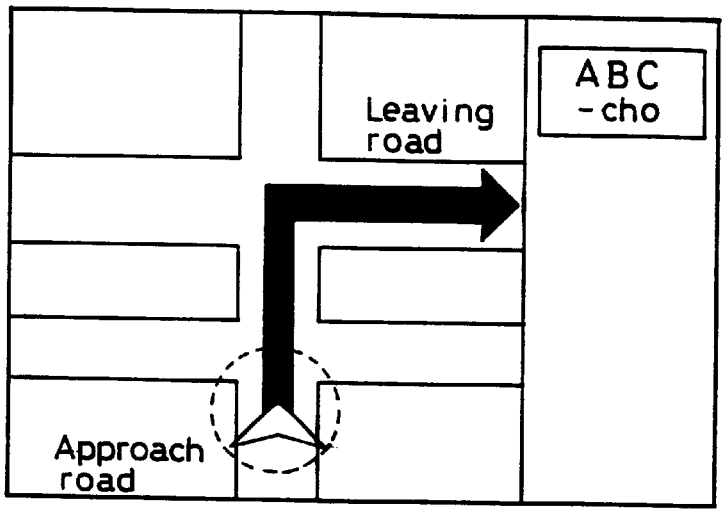
FIG.1A
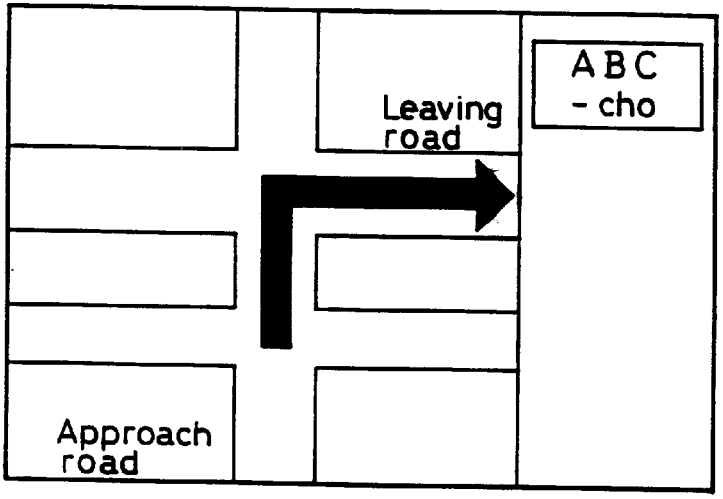
FIG.1B
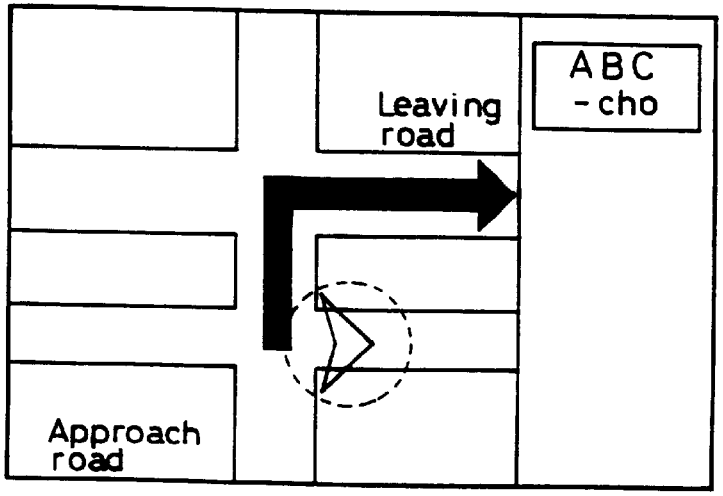
FIG.1C

Roundabout data list

|   | Coordinate value | Direction | Angle |
|---|---|---|---|
| 1 | $x_1, y_1$ | None | |
| 2 | $x_2, y_2$ | Found | 15° |
| ⋮ | ⋮ | ⋮ | |
| $n_0$ | $x_{n0}, y_{n0}$ | None | |

Roundabout data list

|   | Data No. | Intersection / road |
|---|---|---|
| 1 | Road 1 | Road |
| 1 | Road 2 | Road |
| 2 | Road 3 | Road |
| ⋮ | ⋮ | ⋮ |
| $n_1$ | Intersection 1 | Intersection |

FIG. 12A
Suggested-road data

| Number of roads (n) | | |
|---|---|---|
| 1 | Road No. | |
| | Length | |
| | Road-attribute data | |
| | Shape-data address & size | |
| | Guidance-data address & size | |
| ⋮ | | |
| n | | |

FIG. 12B
Shape data

| Number of nodes (m) | |
|---|---|
| 1 | East longitude |
| | North latitude |
| ⋮ | |
| m | |

FIG. 12C
Guidance data

| Intersection name |
|---|
| Precaution data |
| Road name data |
| Road name audio data address & size |
| Destination data address & size |

FIG. 12D
Destination data

| Number of destinations (k) | |
|---|---|
| 1 | Destination road No. |
| | Destination name |
| | Destination name audio data address & size |
| | Destination direction data |
| | Travel guidance data |
| ⋮ | |
| k | |

FIG. 12E
Destination direction data

−1 : Invalidity
0 : Disused
1 : Straight ahead
2 : Rightward direction
3 : Diagonally rightward direction
4 : Direction to return to right
5 : Leftward direction
6 : Diagonary leftward direction
7 : Direction to return to left

FIG. 13A

Road-attribute data

Yes no information Yes: ○

| Overpass/ underpass data | Overpass | |
|---|---|---|
| | Alongside overpass | |
| | Underpass | ○ |
| | Alongside underpass | |
| Number of lanes | Three or more lanes | |
| | Two lanes | ○ |
| | One lane | |
| | No center line | |

FIG. 13B

Road name data

| Road classification | | Classification No. |
|---|---|---|
| Main expressway | Main road | 1 |
| | Ancillary | 2 |
| Municipal expressway | Main road | 3 |
| | Ancillary | 4 |
| Toll | Main road | 5 |
| | Ancillary | 6 |
| General road { | National road | 7 |
| | Prefectural road | 8 |
| | Mis'c | 9 |

FIG. 14A

Precaution data

| Crossing | ○ |
|---|---|
| Tunnel Entrance | |
| Tunnel Exit | |
| Point of reduced width | |
| None | |

FIG. 14B

Travel guidance data

| Bear right | |
|---|---|
| Bear left | |
| Bear center | ○ |
| None | |

FIG. 22

```
┌─────────────────────────────────────────┐
│         ┌─────────────────┐             │
│         │ Search condition│             │
│     Please touch the desired button     │
│─────────────────────────────────────────│ ← C
│   ┌─ En-route point ───────────────┐    │
│   │  ┌──────────┐   ┌──────────┐   │    │
│51─┤──│Designate │   │   No     │   │    │
│   │  └──────────┘   └──────────┘   │    │
│   └────────────────────────────────┘    │
│                                         │
│   ┌─ Toll road ────────────────────┐    │
│   │  ┌──────────┐   ┌──────────┐   │    │
│   │  │  Prefer  │   │   No     │   │    │
│   │  └──────────┘   └──────────┘   │    │
│   └────────────────────────────────┘    │
└─────────────────────────────────────────┘
```

```
┌─────────────────────────────────────────┐
│         ┌─────────────────┐             │
│         │Set en-route point│            │
│     Please touch the desired button     │
│─────────────────────────────────────────│ ← D
│     ┌──────────────────┐ ┌──────────┐   │
│ 52─┤│ Telephone number │ │ Address  │   │
│     └──────────────────┘ └──────────┘   │
│   ┌─ Establishment name ───────────┐    │
│   │ ┌────────────┐ ┌─────────────┐ │    │
│   │ │Golf course │ │Other estab. │ │    │
│   │ └────────────┘ └─────────────┘ │    │
│   └────────────────────────────────┘    │
│   ┌─ Registration point ───────────┐    │
│   │      ┌──────────────┐          │    │
│   │      │ Memory point │          │    │
│   │      └──────────────┘          │    │
│   └────────────────────────────────┘    │
└─────────────────────────────────────────┘
```

FIG. 23
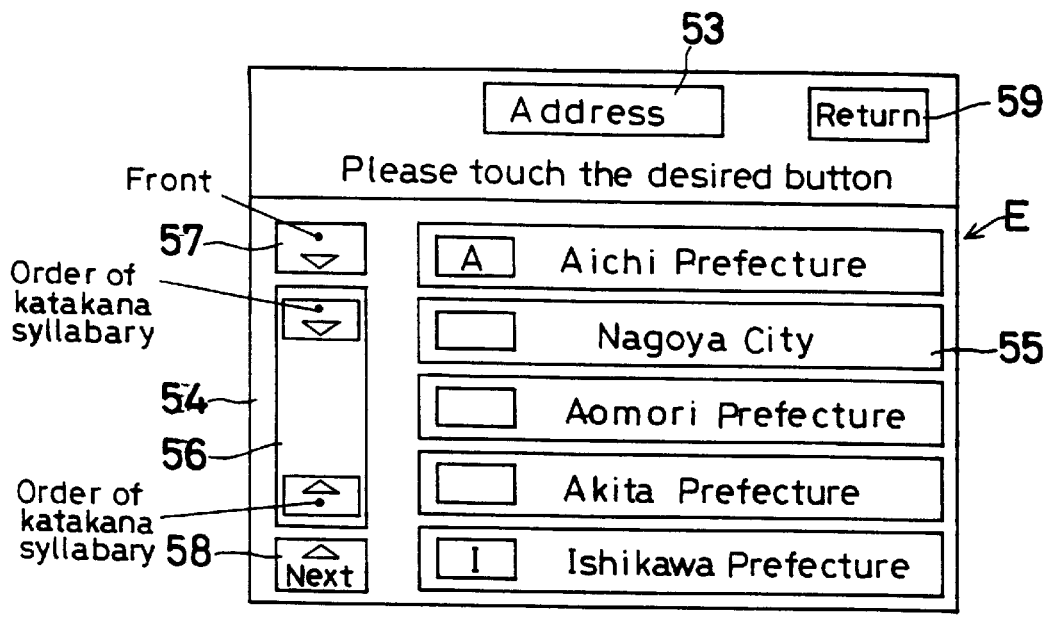
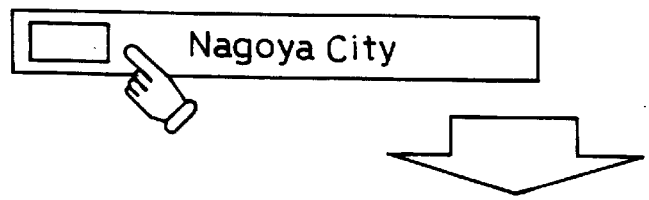
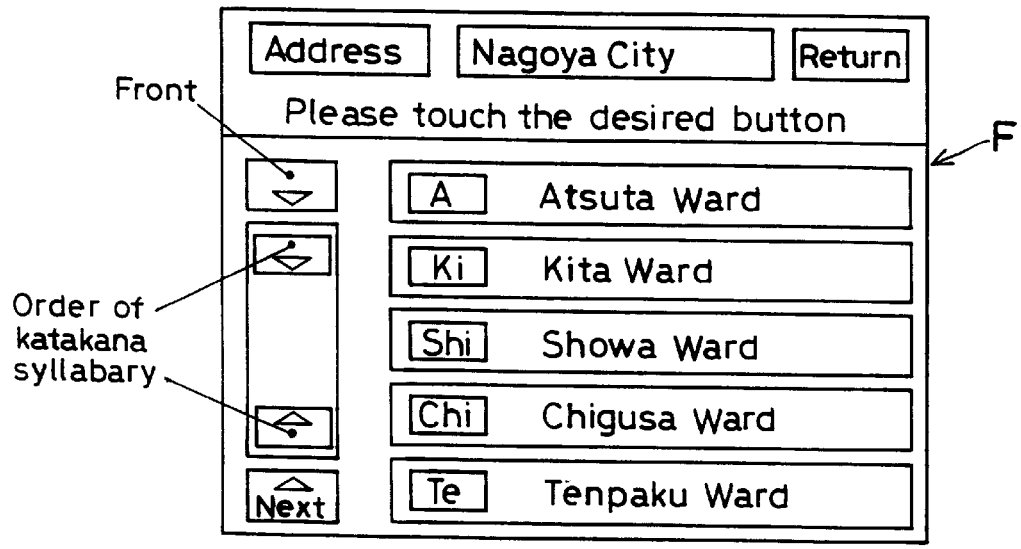
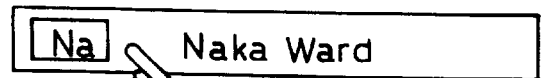

FIG. 25
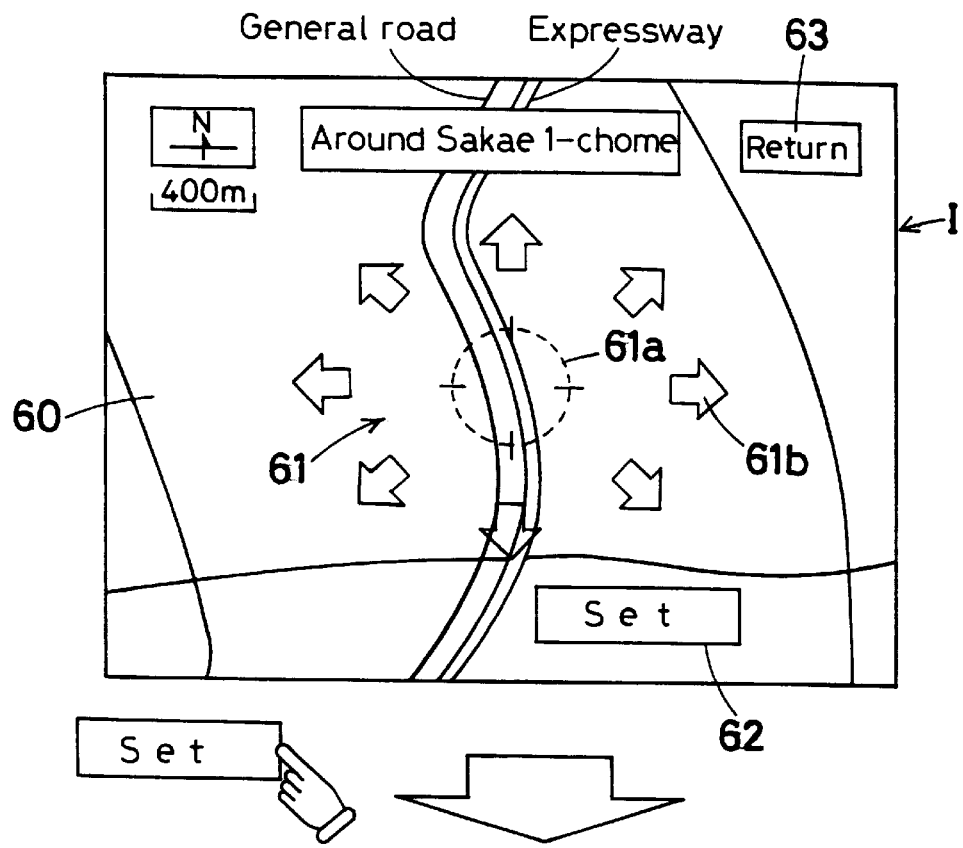
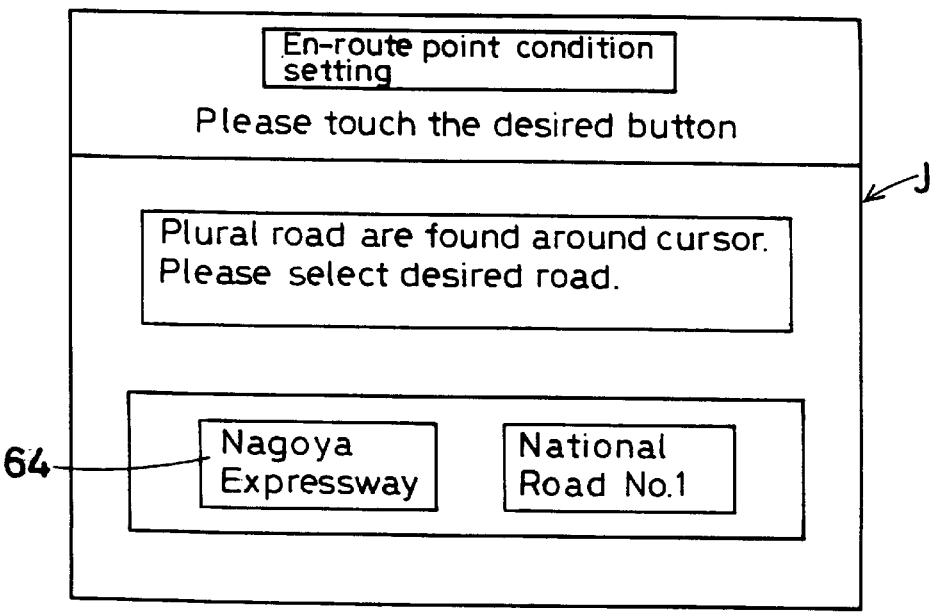
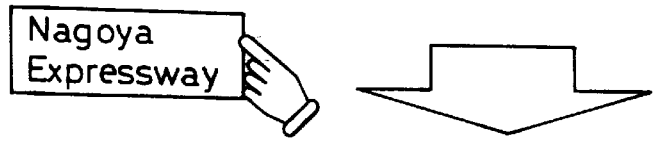

FIG. 35
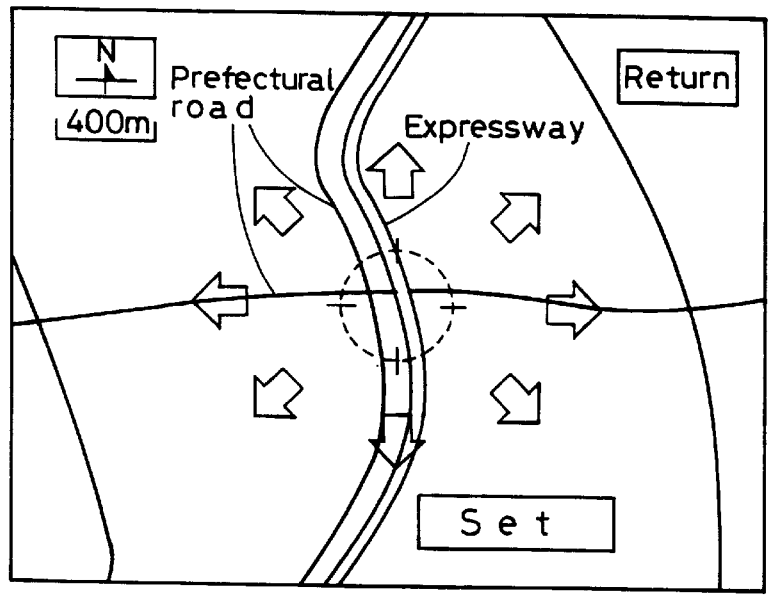
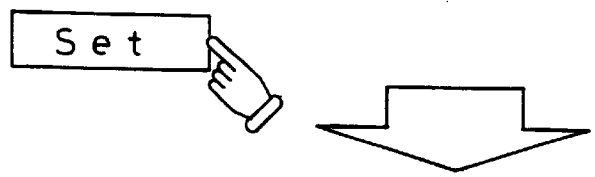
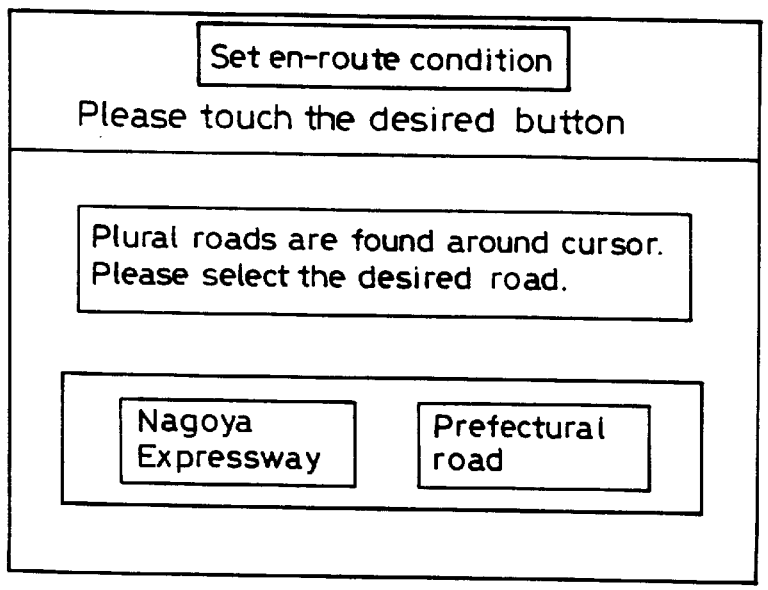
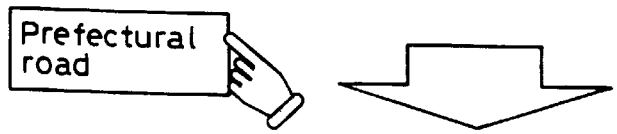

FIG. 36
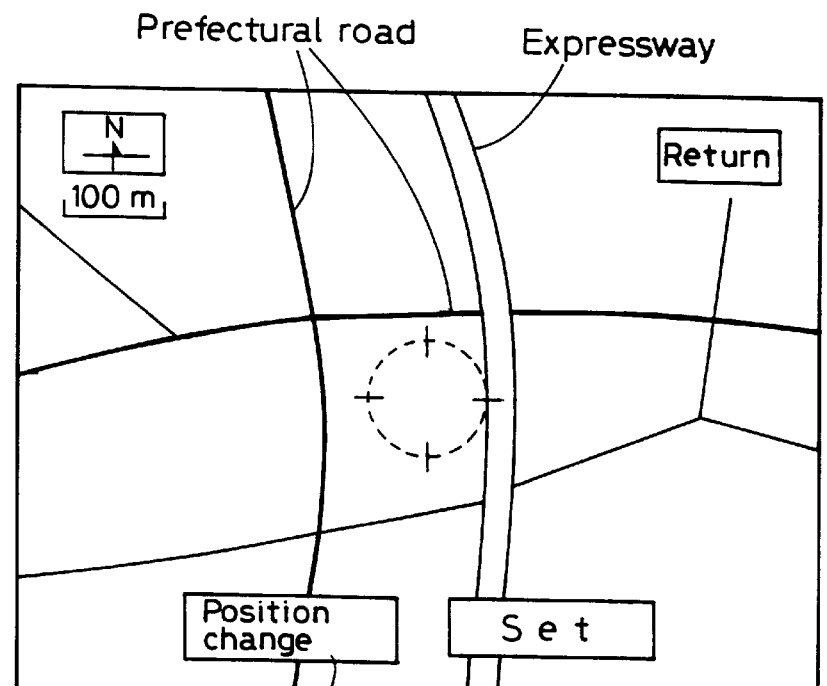
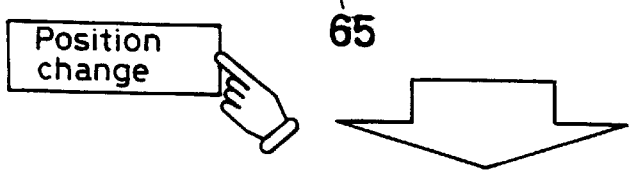
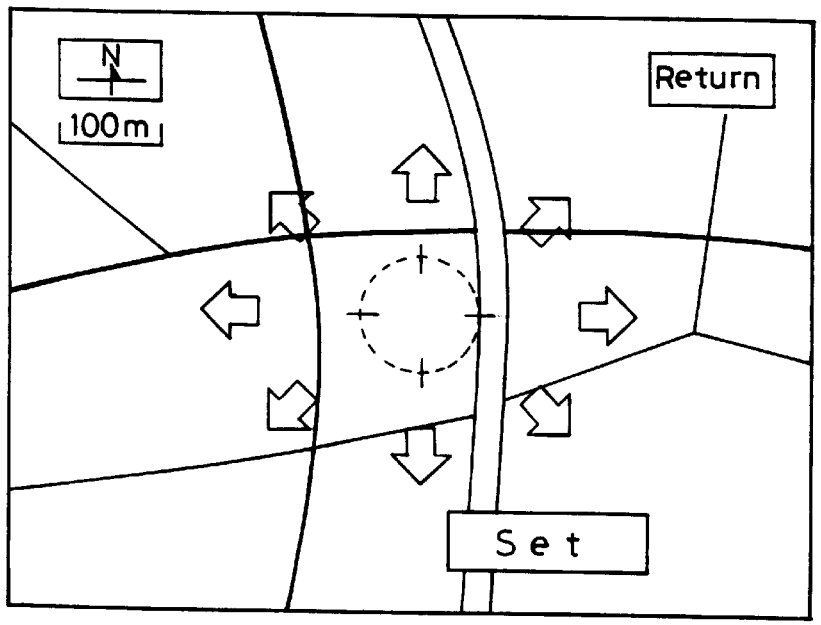

FIG. 37
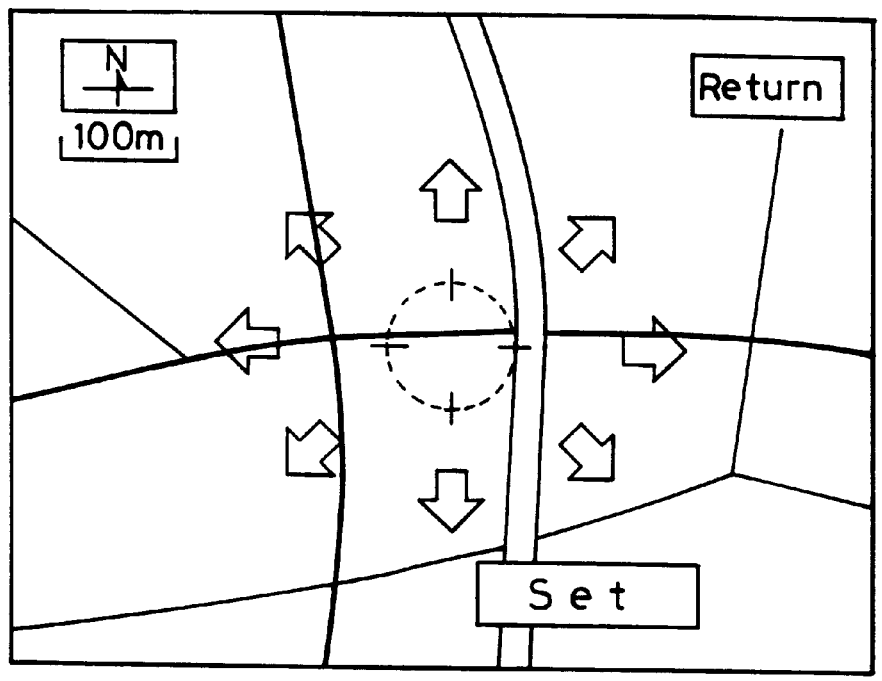
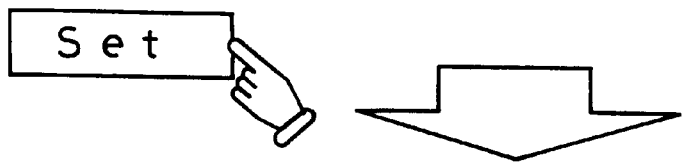
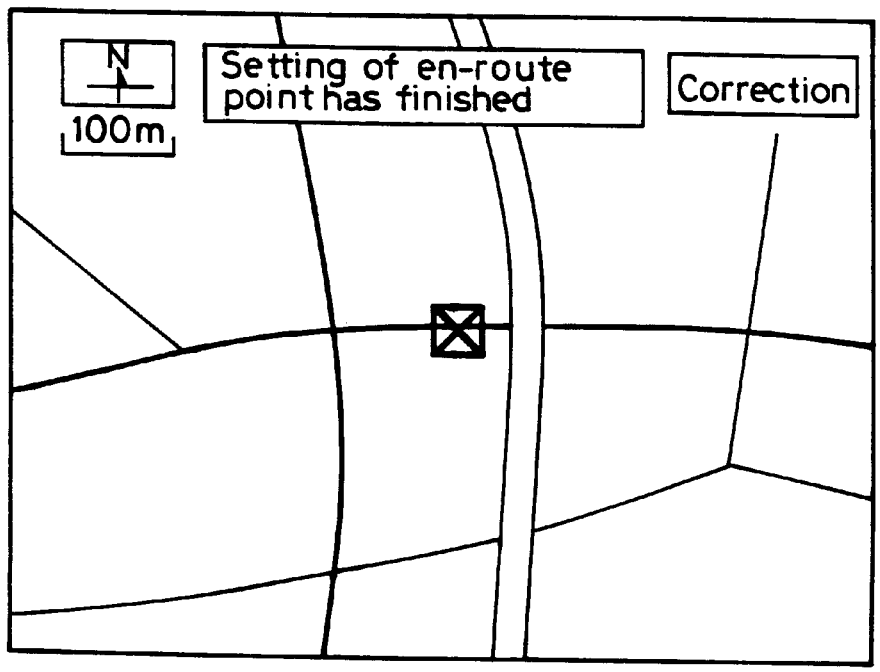

FIG. 39
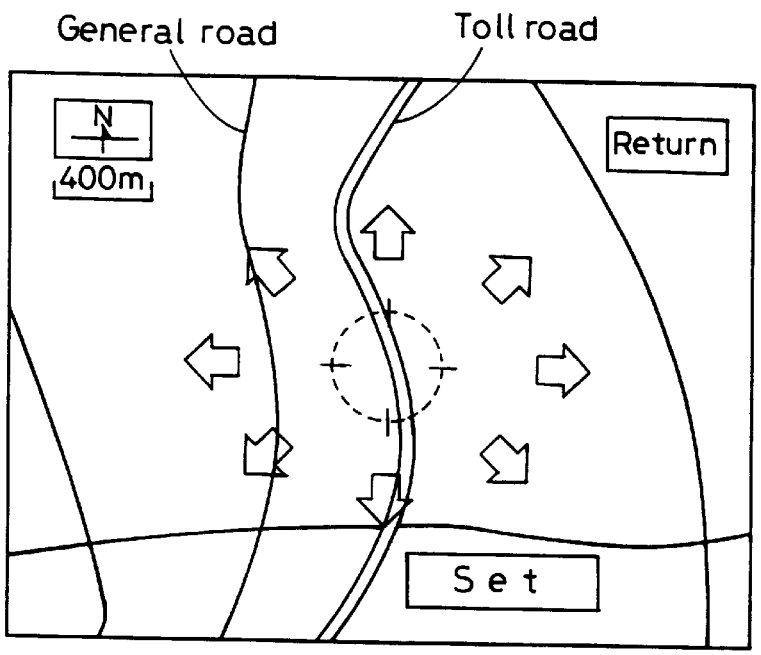
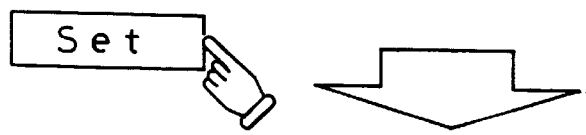
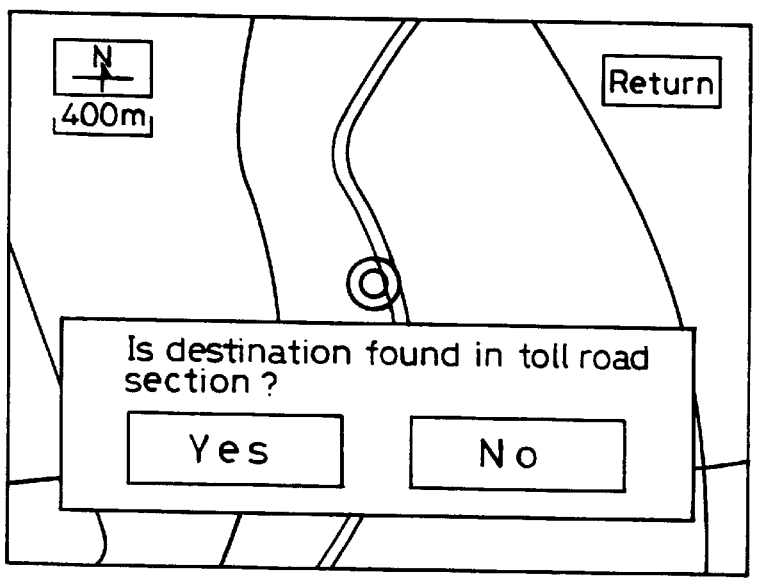

NAVIGATION SYSTEM FOR VEHICLES

BACKGROUND OF THE INVENTION

This invention relates to generally a vehicular navigation system for providing route guidance according to a set route and, more particularly, to a vehicular navigation system which includes an added function of setting a transit point using an expressway or toll road as a transversal road, so chat a road satisfying a transit point condition can be selected from a plurality of roads to provide guidance to a destination through a transit point set on the road or the selected road.

The navigation system for the vehicle searches for a route from the present position of the vehicle or a designated starting location to the destination based on entry of the location, such as the destination, and provides route guidance based on the route found, thereby providing the driver of the vehicle with information on a route to the destination when the vehicle is traveling on unfamiliar roads. To accomplish this, the vehicular navigation system has a function that enables a route from the present position to the destination be searched for based on entry of the destination, a present position sensing function for sensing the present position and direction of the vehicle, a guidance function for collating the detected present position with a guidance route to provide route guidance along the guidance route, and the like. The guidance function enables the guidance route found by the search processing to be displayed on a map or intersection map, for instance, and the present position and direction of travel of the vehicle to be displayed on the map or intersection map to thereby provide route guidance to the driver. In addition, some navigation systems have a function for providing a driver with information on an intersection at which the vehicle must make a turn, for instance, the remaining distance, its name, and whether turning to the right or left, a function for informing the driver of characteristic features to enable the driver to confirm the guidance route during travel, and a function for providing guidance in the form of not only screen displays but voice or sounds as well.

However, when the route is searched for only using entry of locations, such as the departure location and destination, a route is often found which includes locations the driver does not wish to pass through for reasons such as road conditions and environments or heavy traffic. In this case, processing for calculating another route in lieu of the found route may be envisaged. However, even when this processing is executed, the route found often includes a location the driver does not wish to pass through. Such processing may be performed until a route desired by the driver is found. However, this takes much time to find the desired route, and needs awkward operations because the route to the destination must be calculated a good many times.

Various modification are made to route guidance display screens so that for the confirmation of the present position and direction of travel of the vehicle on the guidance route, the driver can take a quick look at a guidance screen as if the driver were looking at meters. For instance, when the present position and direction of travel of the vehicle are displayed on a map, a guidance route on a map or the like is displayed such that the direction of travel can always turn upward or toward the top of the display. Alternatively, a guidance route on a map display can always be displayed with north at the top of the display, so that an arrow indicating the present position of the vehicle is pointed in the direction of travel. Still alternatively, a mark indicating the present position of the vehicle may blink at a given period so that it can be easily identified (see, for instance, JP-A-58-10708).

In a conventional system where a vehicle's present position mark is blinked, however, it is impossible to reduce an updating time length because the updating of the present position of the vehicle occurs in synchrony with the blinking period. This results in a problem that the distance the present position mark moves across a detailed map each blink is increased, especially when the speed of the vehicle becomes high.

FIGS. 1A–1C illustrates problems associated with the conventional system designed to blink the present position mark of the vehicle. Now consider the case where there are a set of successive intersections with the rearmost one being a guidance intersection at which the vehicle must make a turn, as shown in FIG. 1A. When a distance between adjacent intersections is short, it is impossible for the driver to have a precise indication of the present position of the vehicle in motion, when the present position mark of the vehicle is held, or blinked, off as shown in FIG. 1B. Thus, there is a strong possibility of failing to take notice of the intersection at which the vehicle must make a turn. In other words, it is possible that the driver will make a wrong turn at an intersection situated in front of the rearmost one, as shown in FIG. 1C, or pass straight through the intersection at which the vehicle must make a turn. In this case, the driver will take notice of, with surprise, the fact that the vehicle is off course only after the present position mark is displayed or blinked on. Thus, a grave problem with the present position mark blinking system is that it is difficult to achieve any real-time monitoring of the mark position being displayed.

In a system where a vehicle's present position mark is always displayed, or highlighted without blinking, on the contrary, there is a difficulty in looking at or for characters and marks on a map because they remain hidden by the mark. Moreover, due to no change in the screen being displayed, the user has difficulty noticing the fact that the system (computer) is constantly operating. Especially when the vehicle is at a stop, the screen being displayed is often taken as remaining looked.

Vehicular navigation system having a function for setting a transit point and providing guidance to the destination through the thus set transit point are disclosed in JP-A-2-3899, and JP-A-337216. Conventionally accepted methods for setting the destination include those for providing guidance to the destination via a route found on the basis of the entered destination, for providing guidance to the destination through a first destination via a route found using the destination as a second destination, and for setting a plurality of transit points scheduled to be traversed on a map, so that after the vehicle has passed through a give distance from one scheduled transit point, guidance can be provided to the next scheduled transit point. For instance, JP-A-4-220112 discloses a system for providing guidance to the final guidance point with respect to the set destination.

For destination setting input, one method is known, wherein repeated selection is made from an a list of institutions or facilities, such as, buildings, banks, parks, and playgrounds, to derive a registered destination pre-stored in a storage device to thereby set the registered destination as the destination. In another known method, a map having a center positioned at the location of a registered destination is further scrolled through to set a desired location as the destination.

The object of transit point input is to set a transversal road enabling the user to go to the destination through a selected road, to say nothing of setting the aforesaid transit point as the destination. Currently, it is possible to indiscriminately set the transit point on a drivable road or a nearest drivable road. When the transit point is indiscriminately set on an general road, however, it is impossible to set an expressway or municipal expressway as the transversal road. When a guidance point for the transversal point is indiscriminately set on the nearest general road, however, a problem may arise. For instance, when the transit point is set at a store or other transit point situated alongside an expressway or municipal expressway, route guidance onto the expressway or municipal expressway occurs.

Consider, for example, the case where the user sets the destination without recourse to data on registered locations (location data corresponding to telephone numbers, names of establishments or addresses, which have been stored in a storage device and are selected by the user for setting purposes). For instance, when a cursor is moved from pre-displayed map to set the position of the cursor as the destination, or when the data on registered locations is used to display a map having a center positioned at a location corresponding to the registered location, and a cursor is then moved to set a desired location as the destination, it is required to set a location at which a route search finishes, i.e., a final route guidance location, because the location to be set is often found on a drivable road. In the systems proposed in JP-A-4-220112 and JP-A-6-337216, a point on a road, i.e. one identified in the system, that is nearest to the destination, or transit point, is set as a guidance location, i.e., a final guidance point, or a point scheduled to be traversed, respectively. When the destination, or transit point, is set in this way, it is likely that a point on the road that is nearest to the entered destination, or transit point, is always set as a guidance point by reference to road data. As a result, some difficulty arises, that is, in a congested road area or the like, a guidance point is set on a road that is undesired by the user.

SUMMARY OF THE INVENTION

An object of the invention is that when there is a location a driver does not wish to pass through, a route which does not pass through that location is searched for, thereby providing guidance to the destination. Another object of the invention is to provide a present position and guidance information on an east-to-see screen to ensure a real-time monitoring of the position being displayed. Still another object of the invention is to retrieve roads in correspondence to a condition for an en-route location desired to be traversed, as entered by a user, and selection is made from the retrieved roads so that the selected location can be set as the en-route location to be traversed. Yet another object of the invention is to permit a road, satisfying the entered condition for the en-route location desired to be traversed, to be selected from a plurality of roads belonging to different categories.

According to one aspect of the invention there is provided a navigation system for a vehicle, comprising present position sensing means for sensing a present position of the vehicle, information storage means for storing map information, destination setting means for setting a destination, roundabout point setting means for setting a roundabout point, route searching means for searching for a route from the present position to the destination based upon the map information stored in the information storage means, and guidance means for guiding the vehicle along a route calculated by the route searching means, the route searching means being such that when the roundabout point is set, a search cost for a route passing through the roundabout point is made so high that a route to the destination can be searched for, the route having a lowest search cost.

According to another aspect of the invention there is provided a navigation system for a vehicle, comprising present position sensing means for sensing a present position of the vehicle, information storage means for storing map information, destination setting means for setting a destination, bypass setting means for setting a bypass, route searching means for searching for a route from the present position to the destination based upon the map information stored in the information storage means, and guidance means for guiding the vehicle along a route calculated by the route searching means, the route searching means being such that when the bypass is set, a search cost for the bypass is made so high that a route to the destination can be searched for, the route having a lowest search cost.

According to still another aspect of the invention, there is a navigation system for a vehicle which gives guidance based on a route searched for a set destination, comprising destination setting means for setting the destination, location setting means for setting a location desired to be traversed, and route searching means for searching for a route which gives guidance based on the set destination and/or the set location desired to be traversed, the location setting means for setting the location desired to be traversed comprising location input means for entering the location desired to be traversed, road retrieval means for retrieving roads lying within a prescribed range with respect to the location desired to be traversed, based on the location desired to be traversed which has been entered by said location input means, condition setting means for setting a condition for the location desired to be traversed with respect to roads retrieved by the road retrieval means, and road selecting means for offering a selection from the roads retrieved on the basis of the condition for the location desired to be traversed by the location condition setting means, so that a selected road can be set as the location desired to be traversed.

According to yet another aspect of the invention there is provided a navigation system for a vehicle for performing route guidance with a map and a present position mark displayed on a screen, comprising present position sensing means for sensing a present position of the vehicle, information storage means having map information enabling the map to be displayed on the screen for route guidance and other route information loaded into memory, display means for displaying a map for route guidance and the present-position mark, and route guidance means for accepting the present position and direction of travel of the vehicle from a detection signal from the present position sensing means, so that the map information can be read out of the information storage means to display the map and the present position mark of the vehicle on the display means, and for displaying the present position mark in either a continuous mode or a blinking mode which are selected depending on what state the vehicle is traveling in.

Still other objects and advantages of the invention will be obvious from the specification.

The invention accordingly comprises the features of construction, combinations of elements, and arrangement of parts which will be exemplified in the structure hereinafter set forth, and the scope of the invention will be indicated in the claims.

BRIEF DESCRIPTION OF THE DRAWINGS

The invention will be described with reference to the drawing in which:

FIGS. 1A–1C illustrate problems associated with a system for blinking of a present position mark of a driver's own vehicle;

FIGS. 12A–12E illustrate one exemplary structure of a main data file loaded in an information storage device;

FIGS. 13A and 13B illustrate another exemplary structure of the main data file loaded in the information storage device;

FIGS. 14A and 14B illustrate yet another exemplary structure of the main data file loaded in the information storage device;

FIG. 22 illustrates one example of a search condition setting display screen following the map display screen of FIG. 21, and a follow-on transit point setting display screen;

FIG. 23 illustrates one example of a display screen having an address of a transit point entered therein;

FIG. 25 illustrates one example of a detailed map display screen following the screen of FIG. 24, and a transit point condition setting display screen following thereafter;

FIG. 35 is an exemplary illustration of display MODE=2;

FIG. 36 illustrates an example of a map display screen for destination setting, which appears following FIG. 35;

FIG. 37 illustrates one example of a map display screen for destination setting, which appears following FIG. 36;

FIG. 39 illustrates one example of a guidance point set on a toll road;

DESCRIPTION OF PREFERRED EMBODIMENTS

Figure 2:
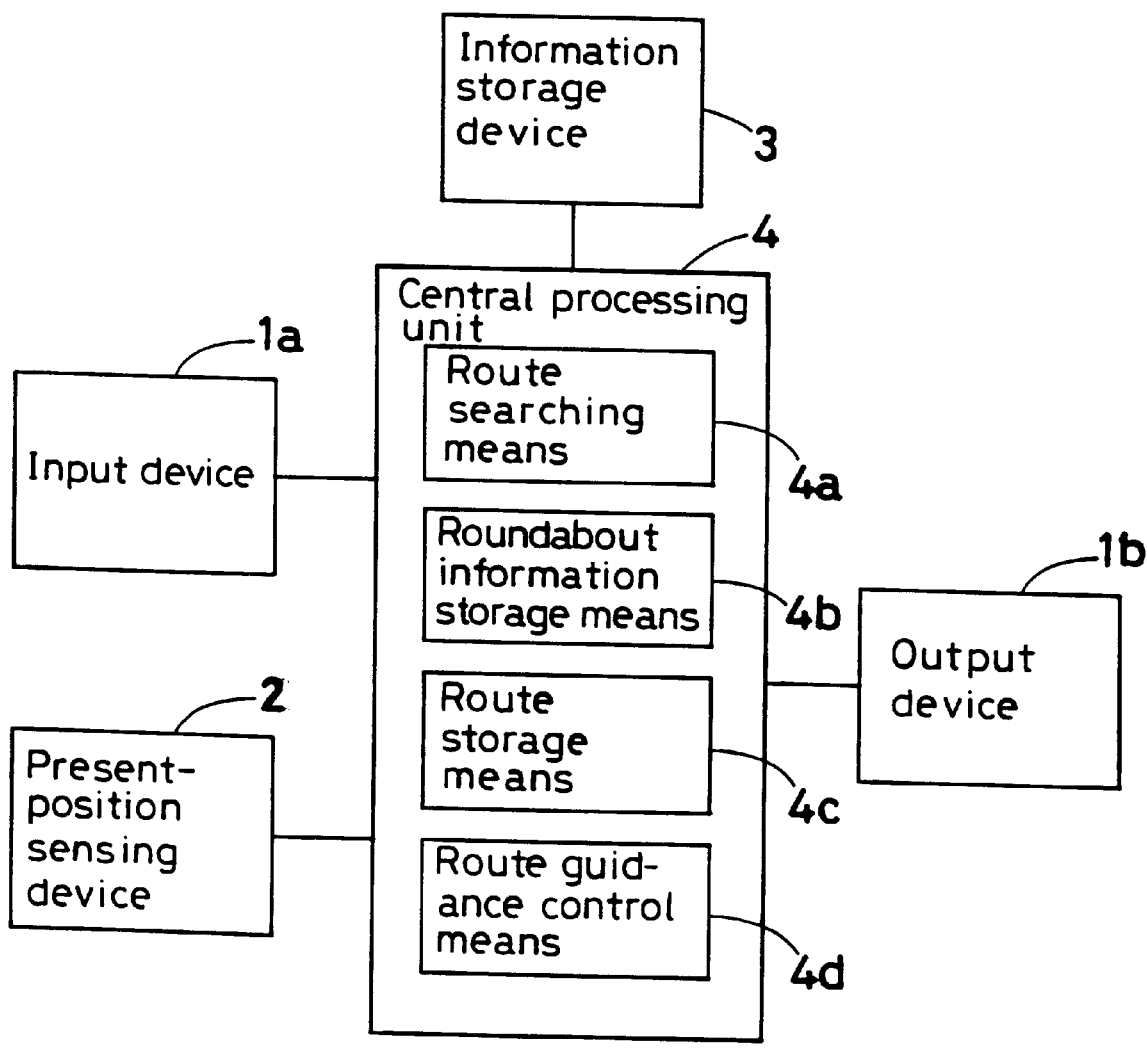
FIG. 2 illustrates one exemplary embodiment of the vehicular navigation system according to the invention.

Referring now to FIG. 2, a present position sensor unit or assembly 2 is made up of a Global Positioning System (GPS) receiver and various other sensors so as to sense the present position of a driver's vehicle (hereinafter called simply the vehicle). An information storage device 3 stores therein map information or other information for performing a route search and route guidance. An input device 1a is to enter a destination and roundabout point into the system, and is made up of a touch panel or remote controller designed to enter into the system instructions for performing a route search from the present position detected by the present position sensor unit 2 to the destination and input route guidance, and a pointing device, such as a joy stick. An output device 1b is composed of a display and/or a speaker to output information that comprises route guidance for the driver. A central processing unit 4 includes route searching means 4a, roundabout information storage means 4b, route storage means 4c and route guidance control means 4d, and sets a destination or roundabout point (point coordinates, direction, road, and intersecting point) according to instructions entered through the input device 1a to seek out a route to the destination having a lowest search cost by increasing search cost for a route passing through the roundabout point on the basis of the route information stored in the information storage device 3, so that the processing for route guidance by the output device 1b can be executed while the present position of the vehicle is detected on the basis of a signal from the present position sensor unit 2. The route search means 4a, if it has the roundabout position entered therein, retrieves a nearby road or intersecting point to store them in the roundabout information storage means 4b. Then, the retrieval cost is converted into a high value, and the route from the present position to the destination is searched for by calculation from the retrieval cost. The route storage means 4c provisionally stores a guidance route determined by the route search means 4a, and the route guidance control means 4d sends a signal for performing route guidance to the output device 1b on the basis of the guidance route stored in the route storage means 4c.

Figures 3, 4A, 4B:
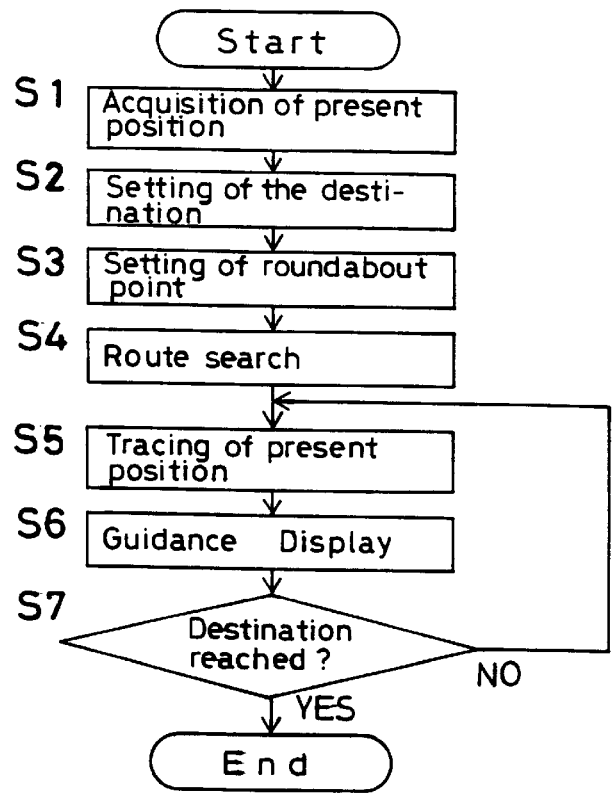
FIG. 3 is an overview of how the navigation system operates.
FIGS. 4A and 4B illustrate a roundabout point list and a roundabout data list.

The aforesaid vehicular navigation system runs its entire processing according to steps such as shown in FIG. 3. First, the present (departure) position needed for the route search is obtained from the present position sensor unit (Step S1). Then, a given destination is set on a destination setting display screen, for instance, according to position input via the input device (Step S2). Then, a given roundabout point is set (Step S3). Referring here to entry of the roundabout point, that is, an intersection or road position through which the driver does not desire to pass, is indicated on a map on a display screen for instance. The thus indicated position is stored in the roundabout information storage means in the form of coordinate values $(x_1, Y_1), (x_2, Y_2), \ldots$ With the search instructions input, the route searching means retrieves a nearby road or intersection to store them in the roundabout information storage means. Then, the search cost for such a road or intersection is converted to a high value to execute the route search, and the thus identified guidance route is stored in the route storage means (Step S4). As a guidance startup instruction is entered in the system, the route guidance control means launches the route guidance. While the present position of the vehicle is being detected and traced by the present position sensor unit (Step S5), guidance information is sent via voice and/or display screens to the output device on the basis of the guidance route stored in the route storage means (Step S6). Then, whether the vehicle arrives at the destination is determined by collating the present position with the destination, and the route guidance comes to an end if the vehicle is found to arrive at the destination.

A detailed account will now be given of how to set the roundabout point, and route search sequences to be performed on the basis on the thus set roundabout point.

As already mentioned, the object of this invention is to enter and set a roundabout point, whereby a route to a given destination avoiding the roundabout point is developed and provided to the driver as route guidance. For this reason, the roundabout information storage means has both a roundabout point list, an example is shown in FIG. 4A, and a roundabout data list, an example is shown in FIG. 4B, registered therein. If information about coordinate values and directions of positions through which the driver does not desire to pass is stored in the roundabout list, then roads and intersections are retrieved on the basis of those points, and stored therein.

Figure 5:
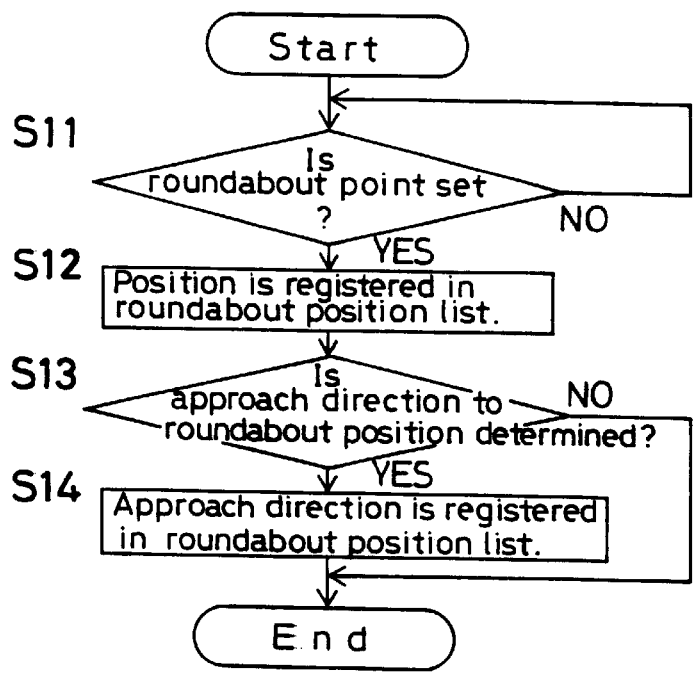
FIG. 5 illustrates how a roundabout point is set.

In the point input and setting sequence, or at the aforesaid Step S3, the roundabout point is set as shown in FIG. 5 (Step S11). Thereupon, the point is registered as coordinate values in the roundabout point list (Step S12), and whether an approach direction to the roundabout point has been determined is then checked up (Step S13). If the approach direction is set, then it is registered in the roundabout point list in the form of an indication of the direction from which the vehicle approaches (Step S14).

Figure 6:
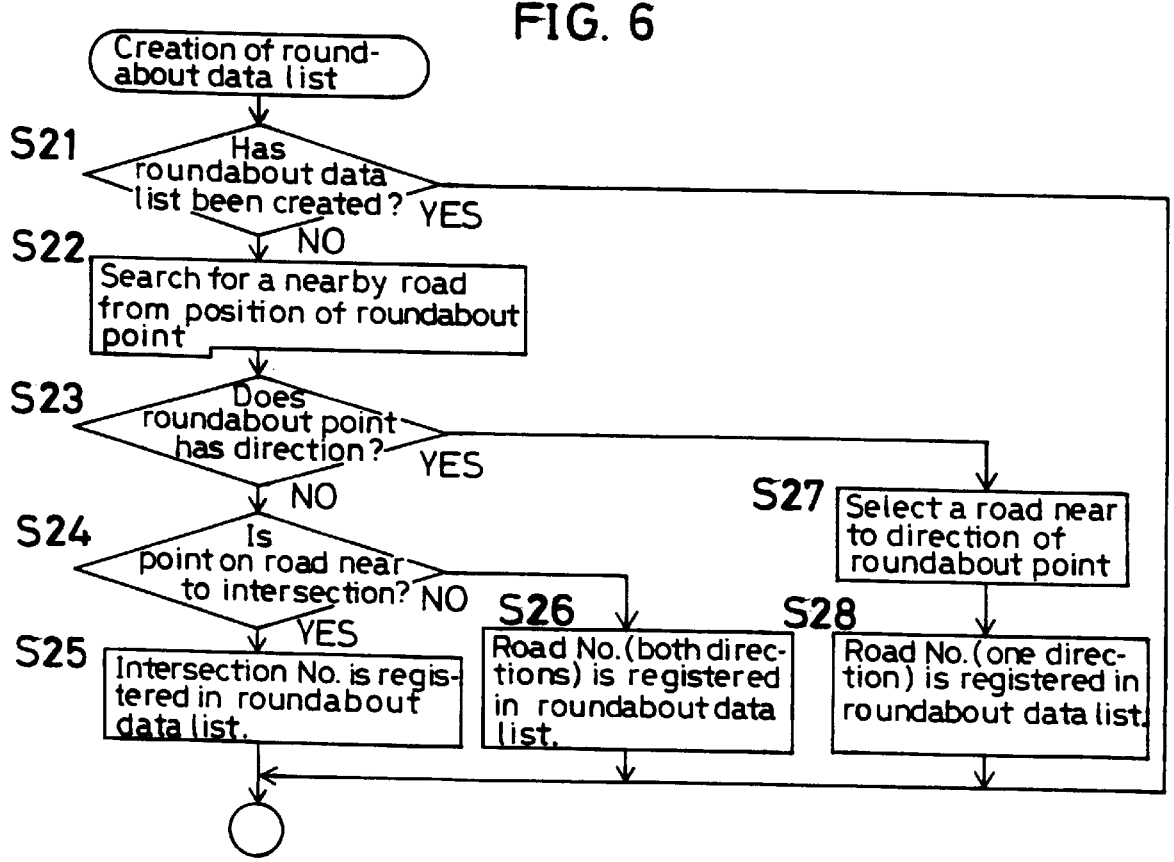
FIG. 6 illustrates how a roundabout data list is created.
Figure 7:
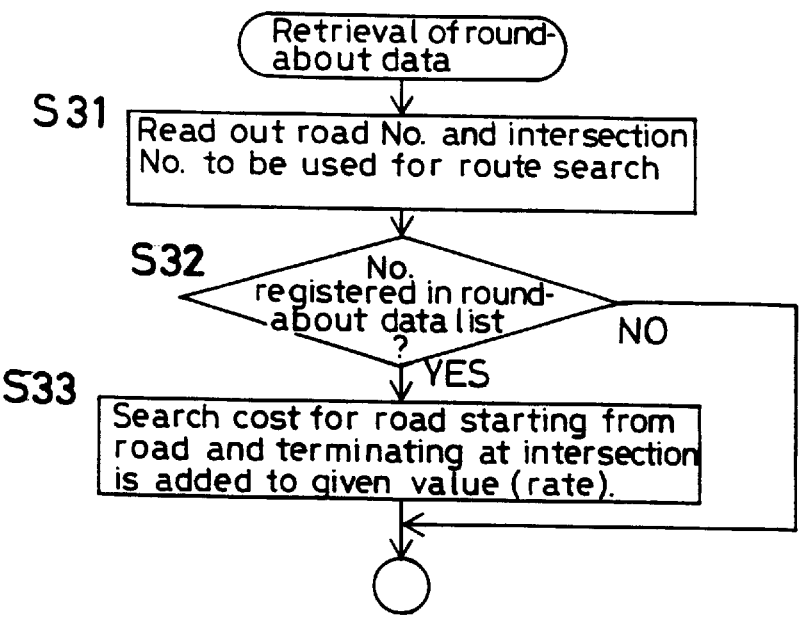
FIG. 7 illustrates how roundabout data retrieval is performed.

Prior to performing the route search step S4, roundabout data list creation and retrieval sequences are run for the registration of roads and intersections from the roundabout point and the changing of their retrieval cost, after which the search to the destination is performed. These sequences are shown in FIGS. 6 and 7. Roundabout point input, for instance, may be carried out either by indicating road and intersection positions on a map displayed on the screen or by indicating a direction using a joy stick, so that the coordinate values of that position and the azimuth of that position, from grid north, are set in the roundabout point list. Consequently, the coordinate values and azimuth are not always in perfect coincidence with those on the map data; that is, it is required to create the roundabout data list by retrieving a nearby road or intersection, and direction from the coordinate values.

In the roundabout data list creation sequence, regardless of whether a roundabout data list has previously been created, which has a road or intersection corresponding to a designated roundabout point registered therein, is first checked as can be seen from FIG. 6 (Step S21). The roundabout point is entered and set in the form of coordinate values such as $(x_1, y_1), (x_2, Y_2), \ldots$, together with the presence or absence of direction, and direction, as shown in FIG. 4A. It is to be noted that the azimuth is a direction with respect to north or 0°. If there is a certain direction, the vehicle takes a roundabout way in that direction alone, and does not in the opposite direction, if the roundabout data list has been created, the sequence comes to an end. However, if the roundabout data list has not been created, a nearby road is searched for on the basis of the coordinate values of the roundabout point (Step S22), after which whether the roundabout point has a direction is checked (Step S23). If the roundabout point has no direction, whether a position on the road is close to an intersection is checked (Step S24). Here, if the position is close to an intersection, the number of the intersection point is registered in the roundabout data list, whereas, if not, the number of the road (both directions) is registered in the roundabout data list (Step S26). However, if the roundabout point is found to have a direction at Step S23, a road nearer to the direction of the roundabout point is chosen (Step S27), and the number of that road (one direction) is registered in the roundabout data list (Step S28).

Subsequent to the registration of the road and intersection numbers in the roundabout data list, the roundabout data retrieval sequence starts to run. At this processing step, as shown in FIG. 7, while the road and intersection numbers are collated with the roundabout data list (Step S31), judgment is passed on whether they are registered in the roundabout data list (Step S32). If they are registered, a given value is added to the search cost for the road number, starting or terminating with the search cost for the road and the intersection number, respectively (Step S33). Usually, the search cost is set for the road (number) in terms of the time and distance traveled, ease of travel (road width), fees, or other factors determining road choices. Accordingly, if the search cost is set in terms of distance, ease of travel depending on road width, types of roads, or other such factors is factored into the cost based on distance, for instance, even when the distance traveled has a physically identical length with respect to a principal road, its distance cost becomes shorter for expressways while it becomes longer for local roads. Referring here to roads registered in the roundabout data list, a certain value is added to these calculated distances or some distance is added thereto at a certain ratio or factor. Thus, if the shortest route to the destination is searched for in terms of the calculated distance, the resultant route departs from the target route because a route including the roads registered in the roundabout data list is apparently longer in distance than others. The same also holds for when the search cost is set for an intersection (number) in terms of the direction of travel, i.e., turning to the right or left, and traveling straight ahead.

When any desired route which does not pass through a roundabout point cannot be found even by performing search at varied search costs as mentioned above, there is no choice but to go to the destination through the roundabout point because a guidance route passing through the roundabout point is the only one produced even with the high search cost. In other words, when all bypasses and intersections are excluded from the route to be searched for, a route to the destination cannot be obtained unless there is at least one roundabout point. If the search cost is made high, however, a route passing through a roundabout point is then searched for as the sole route unless any route not passing through a roundabout point is found. Even when a guidance route not passing through any roundabout point can be found, it is actually likely that the vehicle deviates from the guidance route for some reasons or as a result of having made a wrong turn at an intersection, and so passes through a roundabout point. In such a case, if the set roundabout point is displayed on a route guidance maybe a special mark, for instance, where the roundabout point is located with respect to the guidance route may then be indicated. Furthermore in this case, if beeps, for instance, are emitted when the vehicle approaches a roundabout point, it is again possible to inform the driver that the vehicle is coming near to a roundabout point. An example of processing therefor is illustrated in FIG. 8.

Figure 8:
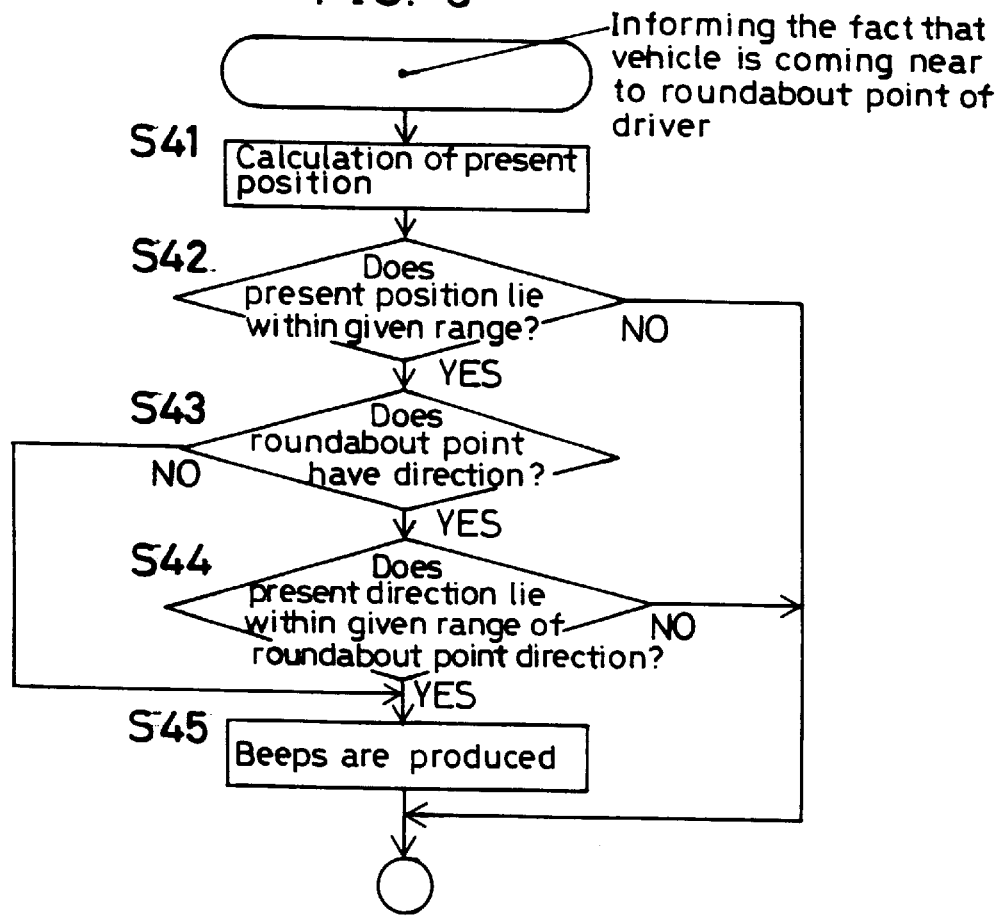
FIG. 8 illustrates how the fact that the vehicle comes near to the roundabout point is reported to the driver.

Referring to the processing for informing the driver that the vehicle is approaching a roundabout point, the present position of the vehicle is first calculated from a detection signal from the present position sensing unit (Step S41), as shown in FIG. 8. Then, whether the present position lies within a given range from a roundabout point is checked (Step S42). If the present position is found to lie within the given range from a roundabout point, it is checked whether the roundabout point has a direction (Step S43). If the roundabout point has a direction, it is checked whether the present position lies within a given range for the direction of the roundabout point (Step S44). If the present position is found to lie within the given range, beeps are produced (Step S45). If the roundabout point is found to have no direction, then beeps are also immediately produced (Step S45). The beeps alert the driver that the vehicle is approaching the roundabout point providing a warning of traffic snarls or road conditions and environments the driver will encounter at the roundabout point.

Figure 9:
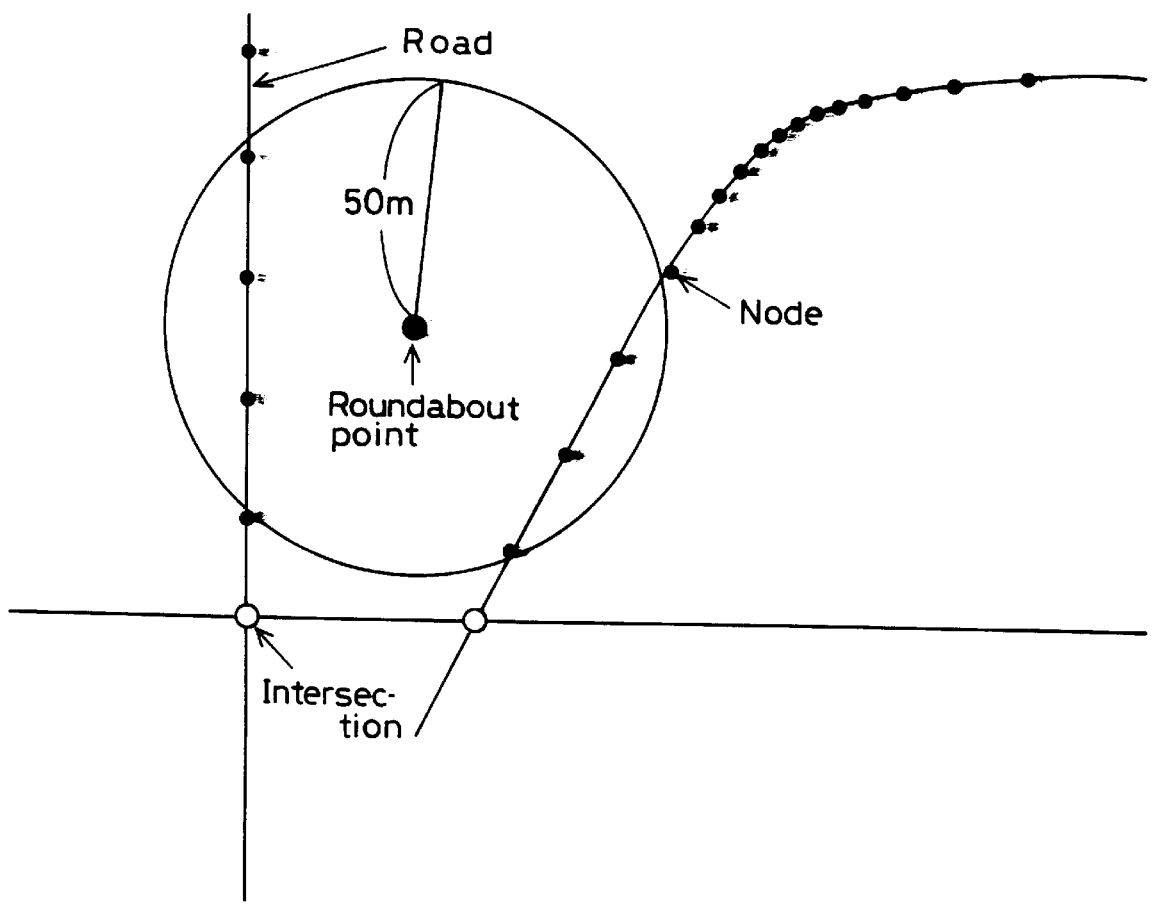
FIG. 9 illustrates how bypasses and intersections are retrieved from the set roundabout point.

When a bypass or intersection is retrieved after the roundabout point has been set by coordinates, retrieval is performed while an area of given radius is set with respect to the set roundabout point, as shown in FIG. 9. For instance, an area having a radius of 50 meters from a roundabout point is set at a first step. Then, it is determined whether an intersection is found within the area. An intersection, if found, is registered as a roundabout intersection or point. If no intersection is found, and a road is found, it is retrieved to register it as a bypass, i.e. a roundabout point. When a plurality of roads are found within the area, a road with the shortest distance between the coordinates of each node and the set roundabout point is selected for registration as a roundabout point. All road data is composed of a node train, i.e. a series of nodes spaced along the road, each node having specified coordinates. In road retrieval, a distance between each node and the roundabout point is calculated, and whether the calculated distance is shorter than the set radius is then judged. When neither an intersection nor a road is found, similar retrieval is performed with respect to an area having a radius enlarged a further 50 meters, i.e., to 100 meters. Of course, such retrieval can be performed for intersections alone or roads alone.

Figure 10:
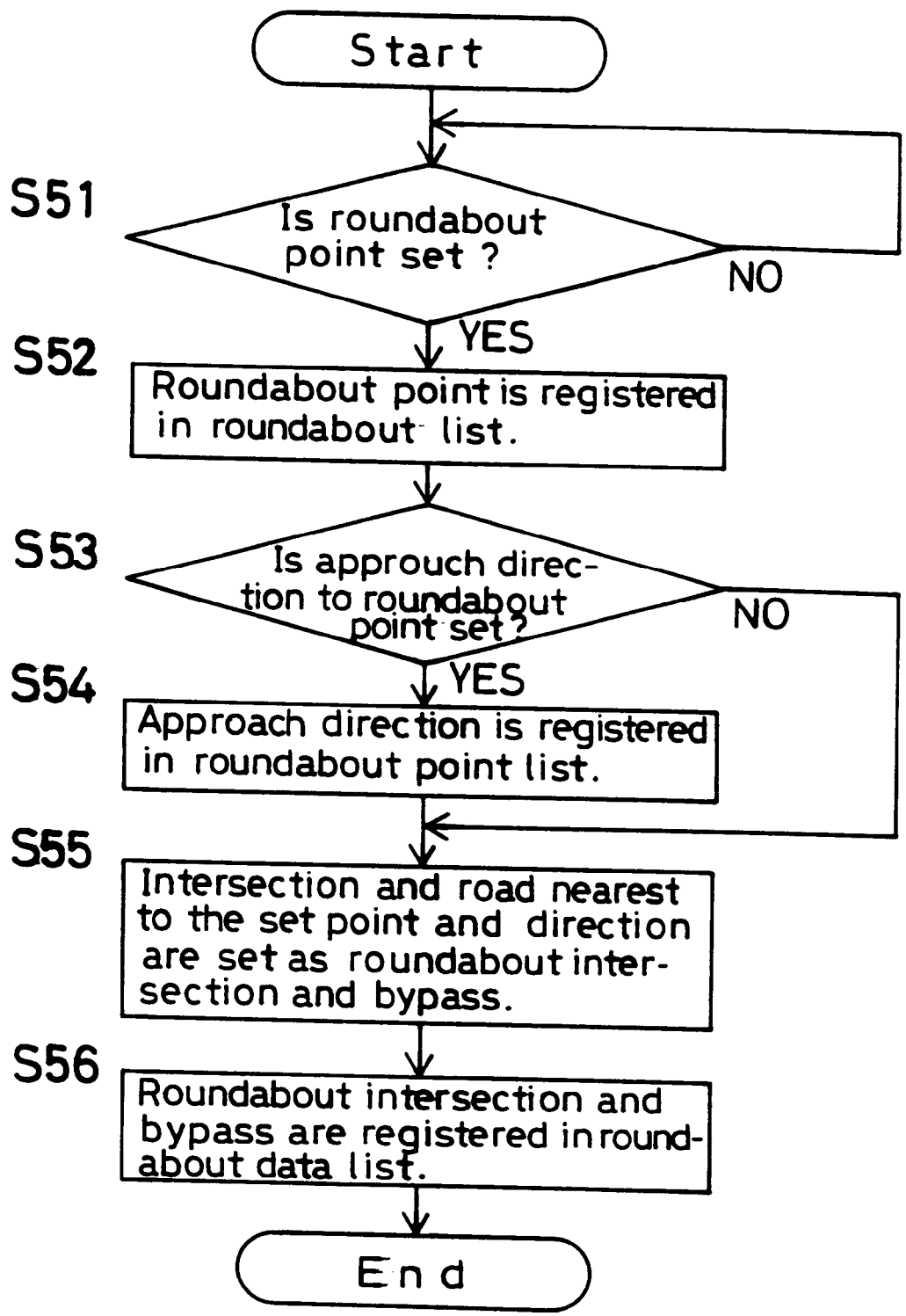
FIG. 10 illustrates how the retrieval bypasses and intersections from the set roundabout point is set.

The setting of the roundabout point (FIG. 5) may be performed, concurrently with, rather than separately from, the creation of the roundabout data list (FIG. 6). That is, when the roundabout point is set, as shown in FIG. 10 (Step S51), it is registered in the roundabout point list (Step S52). Then, it is checked whether a direction of approach to the roundabout point (Step S53) is set. If a direction of the approach is set, it is registered in the roundabout point list (whether a direction is present is checked, and if present, that direction is registered) (Step S54). Subsequently, an intersection and road located nearest to the set pint and direction is retrieved, and registered as the roundabout point and road (Step S55), which are then registered in the roundabout data list (Step S56).

Thus, if the roundabout point, bypass, or intersection, is stored in the form of a list, it is then possible to dispense with entry of the roundabout point for each route search. In addition, the route search is performed such that the vehicle does not pass through the set roundabout point; if a point through which the vehicle has once passed in the past but through which the driver does not wish to again pass in the future hereafter is set, the driver can surely avoid that point. If the bypass and intersection are registered in the roundabout data list, it is then possible to reduce the search time because, in route retrieval, there is no need of retrieving any corresponding road. Also, if the coordinates of the roundabout point are registered in the roundabout point list, it is then possible to make direct use of the roundabout point even when one map data is changed to another with changes in road numbers, intersection numbers, or the like.

Figure 11:
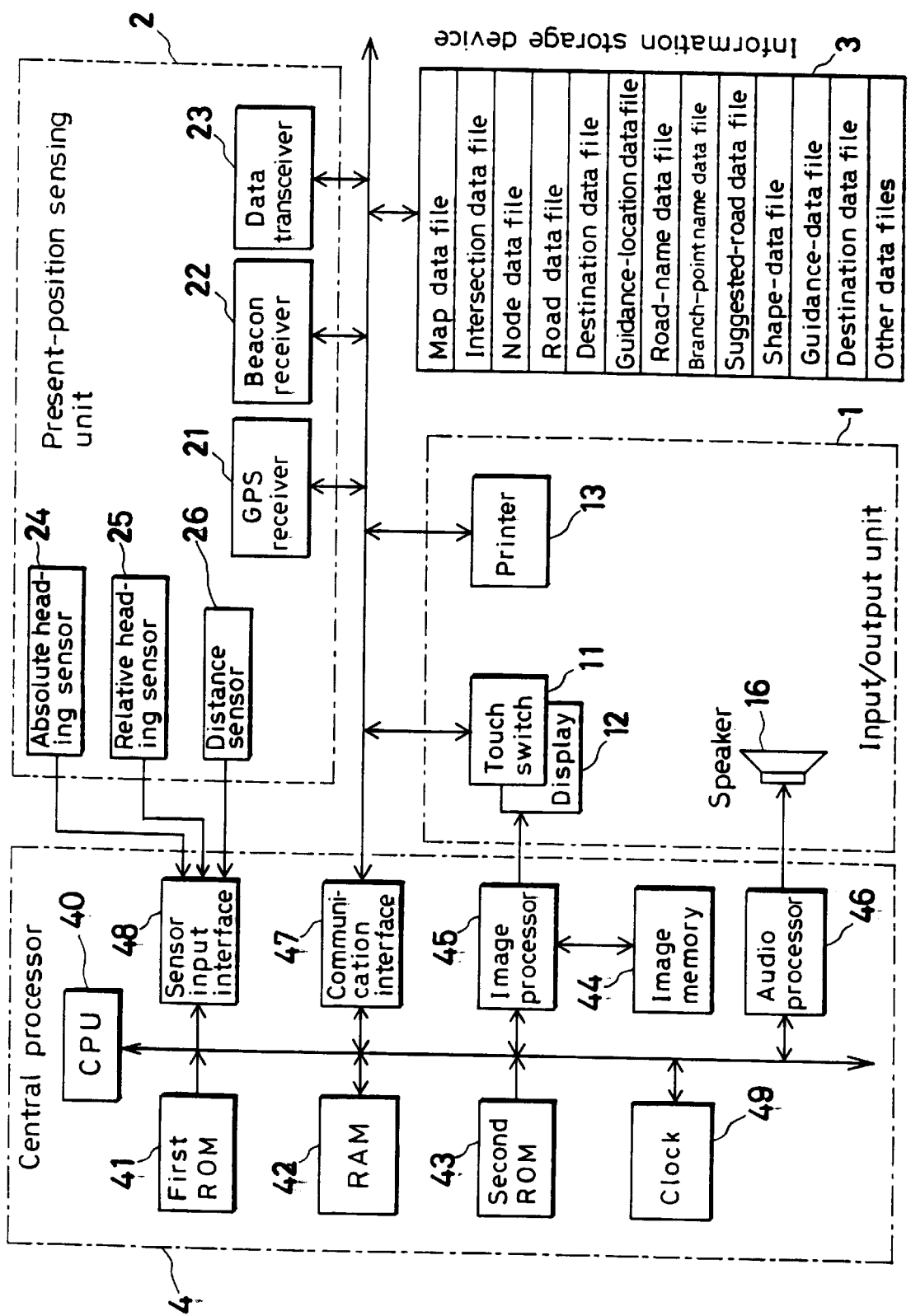
FIG. 11 illustrates one exemplary structure of the vehicular navigation system according to the invention.

The vehicular navigation system in accordance with this invention is shown in greater detail in FIG. 11, and includes an input/output unit 1 for input/output of information on route guidance, a present position sensor unit or assembly 2 for detecting information on the present position of a driver's own vehicle or car, an information storage device 3 in which the navigation data needed for route calculation, the guidance data needed for guidance and other required data have been stored, and a central processing unit 4 for running route search processing sequences and the display guidance sequences needed for route guidance, and control of the overall system. These components will now be each explained in detail.

The input/output device 1 has the functions of entering into the system the information needed for determining goals such as departures, destinations and transit points, giving the central processing unit 4 an instruction to start executing the navigation processing as directed by the driver so that guidance information is provided to the driver in the form of voice (sound) and/or image output as selected by the driver, and printing out processed data. As means to implement these functions, the input section has a touch switch 11 or other operating switch to enter into the system a destination in the form of a telephone number or map coordinates and to request route guidance. A remote controller may be used as the input means.

The output section includes a display 12 designed to display the entered data on a screen and, when required by the driver, enable route guidance to be automatically displayed on the screen; a printer 13 designed to print out the data upon processed on the central processing unit 4 and data loaded in the information storage device 3; and a speaker 16 designed to produce route guidance in the form of voice output.

There may also be provided a voice (sound) recognition unit designed to enable voice input and/or a recorded card reader for reading data recorded on an IC or magnetic card. Provision may also be made for a data communication system designed to exchange data between an information center for providing the necessary information to the driver upon demand from a collection of information stored there at via communication lines and an information source such an electronic notebook with map data, destination data and driver's own data pre-stored therein.

The display 12 is a color CRT or color liquid crystal display device. The display 12 produces all the color image outputs needed for navigation purposes on the basis of map and guidance data processed on the central processing unit 4, for instance, route setting images, interval images, and intersection images. The display 12 also serves to display on the screen a button for selecting between the setting of route guidance and the route being guided. In particular, information on intersections, such as names of intersections which the vehicle is to traverse, are optionally displayed on the interval screen in color in the form of a pop-up menu.

The display 12 is located within an instrument panel in the vicinity of a driver's seat. By looking at the interval screen, the driver can learn where her or his vehicle now travels, and then obtain information on what course to take. The display 12 also includes a touch switch 11, in operable association with a function button display output, so that the aforesaid operations can be executed in response to signals input by giving a touch thereto. The input signal generation means may be composed of a combined button and touch switch forming a part of the input section, although no detailed account is given thereof as such is well understood by those skilled in art.

The present position sensor unit 2 includes a Global Positioning System (GPS) receiver 21 making use of the Global Positioning System; a beacon receiver 22; a data transceiver 23 designed to receive GPS correction signals making use of a cellular phone (car telephone) or FM multiplex signals, for instance; an absolute direction sensor 24 composed of, for example, a geomagnetic sensor; a relative direction sensor assembly 25 composed of, for example, a wheel sensor, a steering sensor, or a gyro; and a distance sensor 26, for example, one designed to detect the distance traveled from the number of revolutions of wheels.

The information storage device 3 is a database with a collection of all the data needed for the navigation system stored therein, the database is composed of files comprising a collection of the data needed for route guidance, for instance, map data having map information pre-loaded therein, intersection data having information on intersections pre-loaded therein, node data in which east longitude and north latitude coordinates of one point on a road are pre-loaded, road data in which a collection of information on roads, for instance, types of roads and where each road starts and terminates is pre-loaded, guidance position data in which there are pre-loaded guidance information on geographical features classified for each genre and depending on what they are used for, for instance, various establishments such as gas stations and convenience stores, and their position coordinates, photographic data, registered point data, destination data, guidance road data, detailed destination data, destination reading data, telephone number data, and address data.

The central processing unit 4 includes a CPU 40 designed to run operations, a first ROM 41 in which a program for going through route search and other processing sequences, a program for going through the display output control needed for route guidance and the voice output control needed for voice guidance as well as the data required therefor are pre-loaded, a RAM 42 designed to provisionally load the identified route guidance information, such as the position coordinates of a set destination and the code number of a road surface, and data which is being processed, a second ROM 43 in which the display information data needed for route guidance and map displays is pre-loaded, an image memory 44 in which image data used to produce image output on the display is stored, an image processor 45 designed to fetch image data out of the image memory 44 in response to display output control signals from the CPU 40 and produce image output on the display upon subjected to image processing, a voice (sound) processor 46 designed to synthesize voice, phrases, or a set of words complete in itself read out of the information storage device 3 in response to sound output control signals from the CPU 40 into analog signals which are in turn given out of a speaker 16, a communication interface 47 designed to exchange input/output data via communications, a sensor input interface 48 designed to accept sensor signals from the present position sensor unit 2, and a clock 49 designed to enter date and time in internal dialog information. As the central processing unit 4 accepts data gathered through the sensors of the present position sensor unit 2 via the sensor input interface 48, the CPU 40 calculates the present position coordinates for each constant time length on the basis of such data, and provisionally writes the result into the RAM 42. The present position coordinates have been subjected to map matching while errors in data upon detection are taken into account. All values each sensor produces are always corrected. As noted, the driver can select between screen displays and voice outputs for receiving the route guidance.

FIGS. 12A to 14B illustrate exemplary structures of main data files pre-loaded in the information storage device. FIG. 12A illustrates a guidance road data file pre-loaded in the form of the data needed to provide route guidance based on the route search. This file comprises, for each of n roads, a road number, length, road attribute data, shape data, address and size, and guidance data address and size.

The road number is set in terms of (outbound or inbound) direction for each road between branch points. The road attribute data is road guidance aiding information data and, as shown in FIG. 13A, is composed of data on whether the road is an overpass, a road alongside an overpass, an underpass or a road alongside an underpass, and data on the number of lanes. The shape data has coordinate data which, when each road is divided into a plurality of nodes, comprises east longitude and north latitude for each of m nodes, as shown in FIG. 12B. As illustrated in FIG. 12C, the guidance data comprises intersection (branch point) names, precaution data, road name data, address and size of road name voice data, and address and size of destination data.

In the collection of the guidance data, the precaution data is to indicate information on whether there is a railroad crossing, a tunnel entrance or exit, a point of reduced road width or nothing, as shown in FIG. 14A. The data is to warn the driver of the presence of conditions where caution should be exercised other than a branch point. As shown in FIG. 13B, the road name data is to indicate information on road category, such as expressway, municipal expressway, toll road and general road (national road, prefectural road, etc.), and to indicate whether the expressway, municipal expressway or toll road is a main road or ancillary road. This data is composed of road classification data and classification numbers, namely individual number data for each road classification. As shown in FIG. 12D, the destination data comprises the number and names of destinations, the address and size of destination name voice data, destination direction data, and travel guidance data.

In the collection of the destination data, the destination direction data is to indicate information representing invalidity (meaning that the destination direction data is not used), disuse (guidance is not given), straight ahead, right direction, diagonally right direction, direction returning to right, left direction, diagonally left direction, and direction returning to left, as shown in FIG. 12E. As shown in FIG. 14B, the travel guidance data is to have pre-loaded data for instructing the driver which lane to take when there are a plurality of lanes, or to enable the driver to select among right, center and left lanes, or do nothing.

This invention is in no sense limited to such a specific embodiment as mentioned above, and so many modifications may be made thereto. In the embodiment explained above by way of example, the roundabout point entered into the system is registered in the roundabout point list. If no roundabout data list is available for route search, the roundabout data list is created by the retrieval of roads or intersections near to the roundabout point. However, if the roundabout point list is designed such that it is updated to add or erase something to or from it, then the roundabout data list can be created as a pre-processing sequence for each route search. Alternatively, the roundabout data list may have been created upon the entering or updating of the roundabout point. Still alternatively, the roundabout data list may have been created such that when the roundabout data list is updated to add or erase something to or from it, the roads and intersections registered about the roundabout point in the roundabout data list are updated to add or erase something to or from them. Moreover, the aforesaid embodiment is designed to emit beeps when the vehicle comes near to the roundabout point; however, it may be modified such that messages are produced in the form of voices or screen displays.

As can be clearly understood from the foregoing explanation, this invention enables a roundabout point to be set to make the road and intersection search cost so high that a route not passing by an undesired point can be calculated, thereby giving the driver the desired route guidance. By setting a road that the driver does not wish to travel along, it is further possible to accurately calculate the route that the driver desires and give the driver accurate route guidance. Moreover, since it is possible to set the direction from which the vehicle should come near to the roundabout point, it is possible to carry out route search individually for certain roads. Referring to roads extending north and south, for instance, the southward road may be judged as a roundabout road, and the northward road as a desired road. Thus, even when the driver does not wish to travel along one road alone, it is possible to give the driver the desired route guidance.

Since the roundabout road or bypass and intersection are set by retrieval with respect to the roundabout point, even points deviating more or less from the road or intersection may be easily set. For achieving this, only the search cost for the corresponding bypass and intersection during route search need be made high, so that the route calculation time can be reduced. In addition, since the roundabout point, bypass and intersection have been stored in memory, they can always be reflected on a route search until they are erased, thereby dispensing with the setting of the roundabout point, bypass and intersection for each route search. By setting a roundabout intersection, it is possible to make search cost high for all roads with starting-points and destinations defined by that intersection, so that when the driver does not desire to travel along a plurality of intersecting roads, only one point can be easily set with no need of determining a plurality of points.

Reference will now be made to a specific embodiment of the instant invention wherein when route guidance is provided while a map is displayed on the screen of the aforesaid display 12 along with a present position mark of a vehicle, a switch-over is conducted between a blinking display mode and a continuous display mode depending on traveling conditions, such as travelling speed, relations with respect to a guidance point, for instance, whether the vehicle is near to or far away from a guidance-starting point, kinds of maps showing surrounding areas of the present position having varying amounts of information, and other conditions, and the blinking period is varied. Processing for these is performed by the route guidance means in the CPU of the central processing unit 4. In what follows, a specific example of processing for the present position switch-over display modes will be explained.

Figure 15:
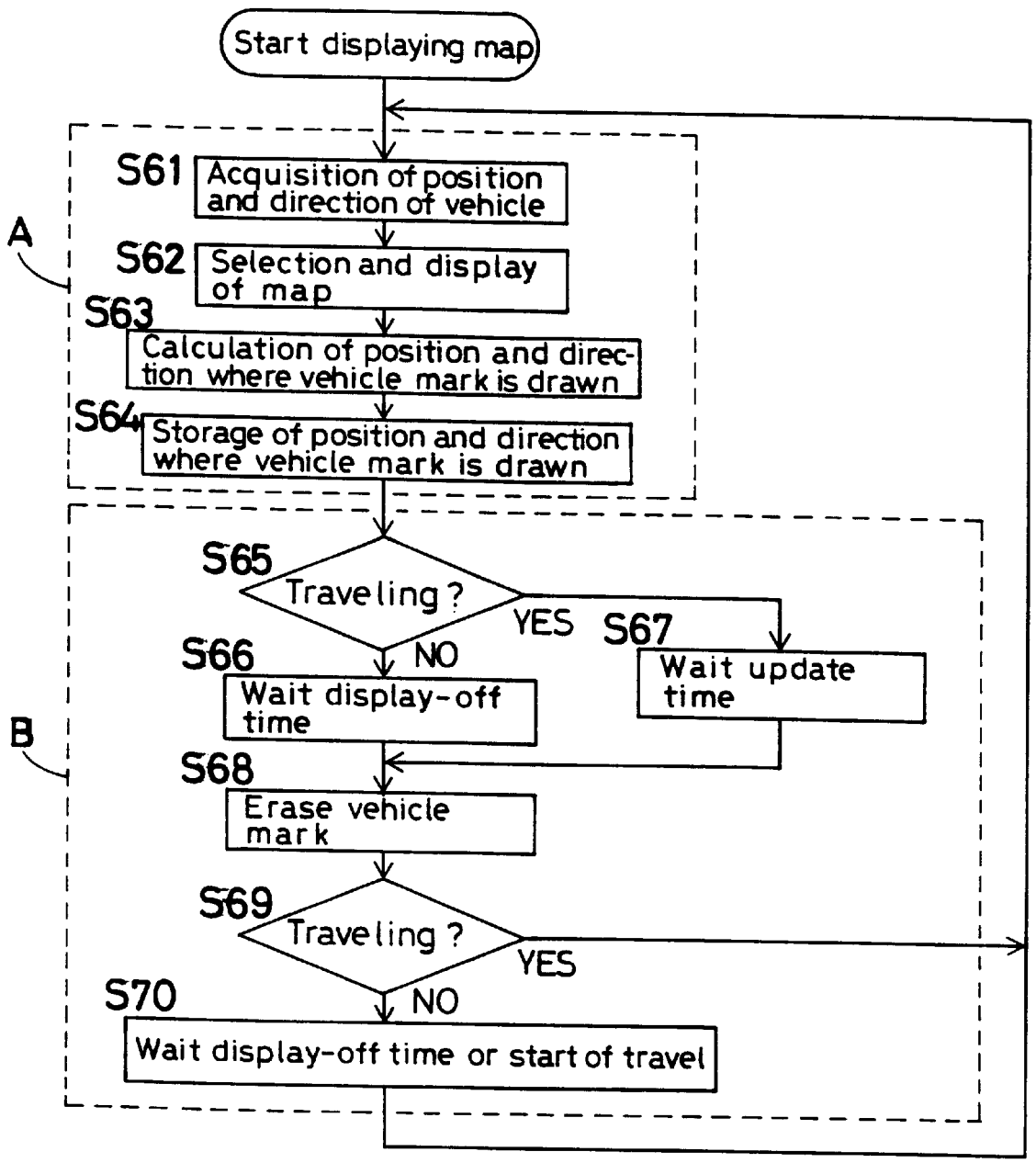
FIG. 15 illustrates one example of map display processing through which a present position mark is blinked only when the vehicle is at a stop.
Figure 16:
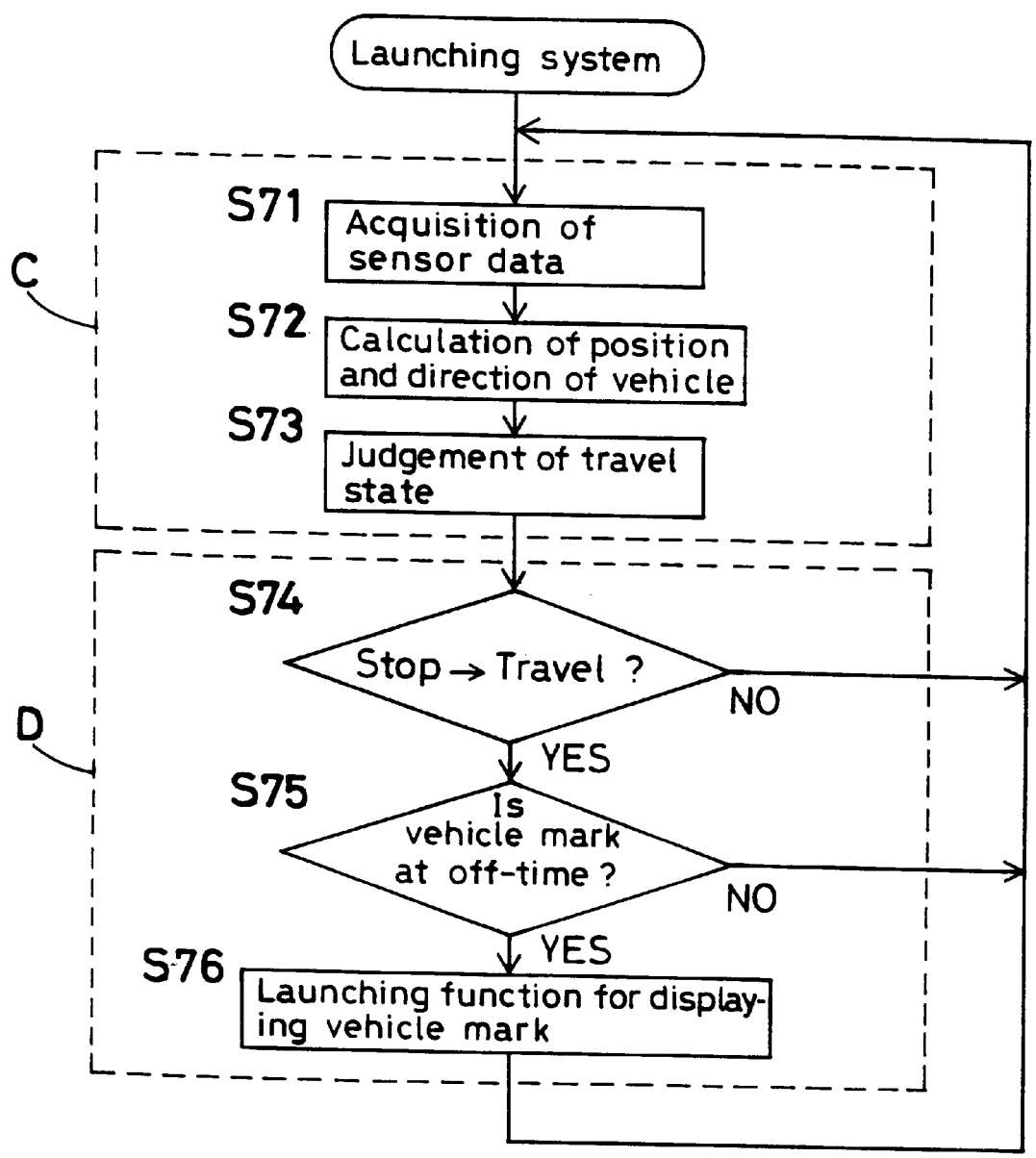
FIG. 16 illustrates one example of how a present position mark display is controlled.

To display the present position mark in the blinking mode only when the vehicle is at a stop, first, a map appears as shown in FIG. 15. Thereupon, the present position and direction of travel of the vehicle are acquired on the basis of detection signals from the sensors of the present position sensing unit 2 (Step S61), and map data is selected, read, and displayed on the basis of the thus acquired present position and direction of travel (Step S62). Then, the position and direction of the present position mark to be displayed, while it is superposed on the map, is calculated (Step S63), so that the present position mark is drawn and, at the same time, the drawing position is stored in image memory (Step S64). Then, a judgment is made whether the vehicle is moving or at a stop (Step S65). If the vehicle is at a stop, the present position mark is erased after the lapse of a time length during which the display continues to be held on (Step S66→S68), and if the vehicle is moving, the present position mark of the vehicle is erased after the lapse of an updating time length (Step S67→S68). Subsequently, judgment is passed on whether the vehicle is moving or at a stop (Step S69). If the vehicle is moving, the system then goes back immediately to Step S61 to repeat similar sequences. If the vehicle is at a stop, however, the system then goes back to Step S61 upon the lapse of a time length during which the display continues to be held off or after the system has waited for the vehicle to start traveling (Step S70), to thereby repeat similar sequences. It is here to be noted that a dotted block A (Steps S61 to S64) represents the processing for displaying and drawing the vehicle (present position) mark, and a dotted block B (Steps S65 to S70) stands for the processing for updating the display of the vehicle mark. Thus, judgment is passed on whether the vehicle is moving or at a stop, and if the vehicle is moving, the present position mark of the vehicle is erased off for each updating time and, just thereupon, updated (continuously displayed). As the vehicle comes to a stop, however, the present position mark of the vehicle is erased for the display-on time alone and the present position mark of the vehicle blinks at a predetermined period of display-on time/display-off time. Thus, since the present position mark is continuously displayed while the vehicle is in motion, it is possible for the driver to have a real-time recognition of how far away the present position is from the intersection to be traversed or the road to be traveled along, and what relationship the present position has to them. This allows the driver to pass precise judgment on the distance and location to be traveled. Since the present position mark is displayed in the blinking mode while the vehicle is at a stop, on the other hand, it is possible for the driver to see through the map information hidden by the present position mark and, hence, have a precise understanding of the detailed map information about the surrounding areas to the present stopped position.

Referring then to the processing for controlling the aforesaid display, data is first acquired from the absolute direction sensor 24, relative direction sensor 25 and distance sensor 26 of the present position sensor unit 2 (Step S71) to calculate the present position and direction of travel of the vehicle (Step S72) and pass judgment on the travel state of the vehicle (Step S73). A judgment is made whether the vehicle is at a stop or in motion on the basis of the confirmation of what state the vehicle is in (Step S74). If it is found that the vehicle is in motion, a judgment is then made whether the display of the present position mark of the vehicle is turned off or on (Step S75). When the vehicle does not show a stop to travel transition or if the display is held on even in that case, the system goes back immediately to Step S71 to repeat similar sequences as mentioned just above. If the display of the present position mark is held off, the function for displaying the present position mark of the vehicle is launched (Step S76) to go back to S71 to thereby repeat the similar sequences. It is here to be noted that a dotted block C (Steps S71 to S73) represents sensor data processing, i.e., the processing for gaining the identification of the state of travel so as to select between the modes of displaying the present position mark, and a dotted block D (Steps S74 to S76) denotes the processing for managing the display of the present position mark by the state of travel.

Only by selecting between the continuous and blinking display modes depending on whether the vehicle is moving or at a stop, it is often impossible to confirm the map information hidden by the present position mark and, hence, precise map information on surrounding areas to the present position is hidden. This is particularly true of when the movement of the present position mark is slow even though the vehicle is traveling. In a case where the vehicle is traveling at a constant speed, the present position mark may be displayed in the continuous mode, if the map used is an enlarged intersection map such as one shown in FIG. 1, because the amount of movement of the mark across the screen is large. If the map used is a wide-area map, however, the mark should preferably be displayed in the blinking mode because difficulty is involved in recognizing how the mark moves. Thus, even when the vehicle is traveling, the user may select between the blinking and continuous display modes depending on the kind of the map used, the speed of the vehicle, and other prescribed conditions such as the relation of the present position to a destination. A specific embodiment of this will be explained.

Figure 17:
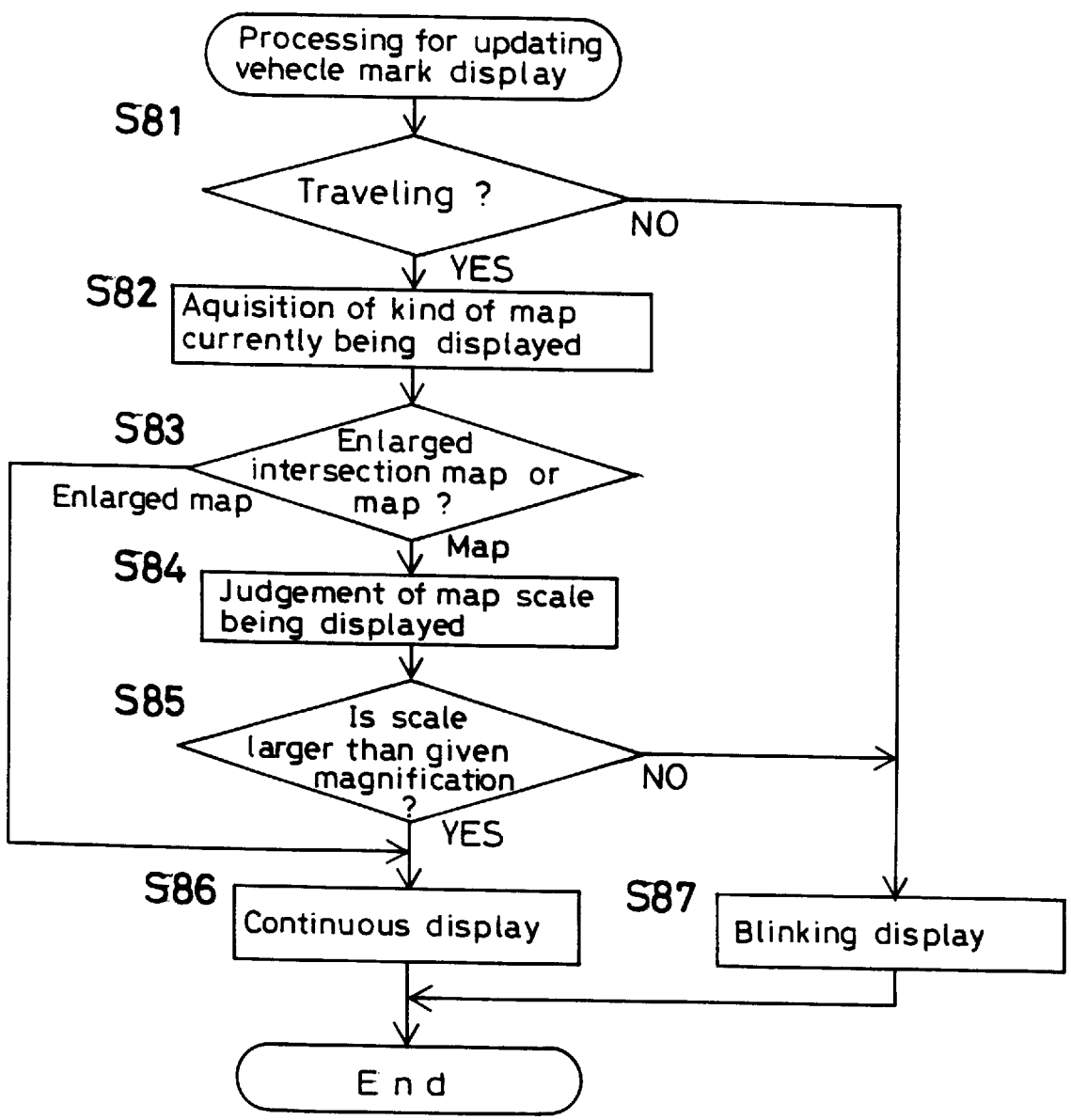
FIG. 17 illustrates another exemplary embodiment of the invention, which permits the system to select between blinking and continuous display modes depending on a map scale.

In addition to a judgment whether the vehicle is moving or at a stop, for instance, the scale of the map being currently displayed may be acquired to judge whether the present position mark is to be displayed in the blinking or continuous mode depending on that scale. In this case, a judgment is first made whether the vehicle is in motion, as shown in FIG. 17 (Step S81). If the vehicle is not in motion, the present position mark is displayed in the blinking mode as is the case with the foregoing embodiment (Step S87). If the vehicle is in motion, the kind of the map being currently displayed is acquired (Step S82). Then, a judgment is made whether the map being displayed is an enlarged intersection map or a route guidance map (Step S83). If the map is an enlarged intersection map, the display of the present position mark is switched over to the continuous mode (Step S86), and if the map is a route guidance map, the scale of the map being displayed is judged (Step S84). Here, a judgement is made whether the scale is larger than a given, or predetermined, magnification (more detailed) (Step S85). If the scale is larger than the given magnification, the display of the present position mark is switched over to the continuous mode (Step S86), and if the scale is not larger than the given magnification, the display of the present position mark is switched over to the blinking mode (Step S87).

As map information, maps drawn on varying reduced scales such as those on scales of 1 to 10,000, 1 to 20,000, and 1 to 40,000 are loaded in memory. Here, the user is permitted to select between the continuous display mode and the blinking display mode at a given reduced scale of 1 to 40,000. It is to be understood that the map used may be drawn either on a stepwise scale or on a stepless scale. Thus, when the enlarged intersection map or a map drawn on a scale larger than the given magnification is displayed, the guidance route often becomes complicated, such as one including curves which the vehicle must turn. With the present position mark displayed in the blinking mode in this case, it is difficult, or even impossible, to achieve a real-time display of the present position mark because there is an increase in the amount of movement of the present position mark across the display screen at the off time. When the map used is drawn on a scale smaller than the given magnification, however, the present position mark can be displayed in the blinking mode with no particular difficulty because the guidance route often follows naturally a road, and the distance of movement of the mark across the display screen is reduced at the off time.

Further, it is easier to recognize the present position mark in the blinking mode. While the aforesaid specific embodiment has been described referring separately to the enlarged display of the intersection and the map display, it is understood that since the enlarged intersection map can be taken as being a detailed map, selection may be made between the continuous display mode and the blinking display mode depending on the magnitude of the given magnification alone.

Figure 18:
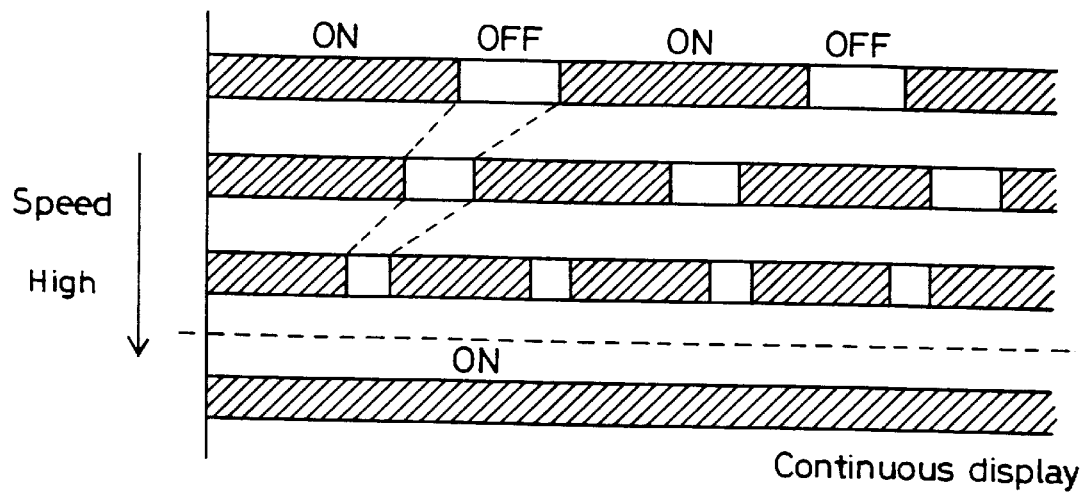
FIG. 18 illustrates yet another embodiment of the invention which permits the system to select between the blinking and continuous display modes depending on the speed of the vehicle.

Upon display in the continuous mode, even when the vehicle is in motion, the present position mark often remains perceptually invisible on the map because the movement of the mark is not noticeable. This is particularly true when the speed of the vehicle is low (or lower) or the scale of the map is very small, i.e., 1 to 40,000 or greater. Thus, when the speed of the vehicle is as low as 5 km per hour or lower, it is easier for the driver to monitor the present position mark in the blinking mode than in the continuous mode. Even upon the present position mark is displayed in the blinking mode when the vehicle travels at a much lower speed, there is little, if any, chance of overlooking a point at which the vehicle must make a turn. Therefore, the present position mark may be controlled such that when the speed of the vehicle is greater than a given speed, it is displayed in the continuous mode, as shown in FIG. 18, and at a speed lower than that, it is displayed in the blinking mode while the on/off time length is increased as the speed decreases. In this case, the present-mark position is controlled such that the on-time length increases (decreases) with the off-time length, as shown in FIG. 18, without altering the ratio between the on-time length and the off-time length while the time length per on/off cycle remains constant. This means that the blinking rate is changed. When the blinking rate is preset at an on/off ratio at which the present position mark is easy to monitor in view of human factor engineering, however, it is preferable to keep the on/off time length ratio invariable. No particular problem arises even when the blinking rate is steadily increased with an increase in the speed of the vehicle. Too high a blinking rate, however, causes the driver to have difficulty in monitoring the present position mark. For this reason, the present position mark is designed to be continuously displayed when the speed of the vehicle exceeds a given value. Of course in this case, it is to be understood that the present. position mark may be designed to be displayed in the blinking mode at a speed lower than the given speed, and in the continuous mode at a speed exceeding that, without making the blinking rate variable.

Figure 19:
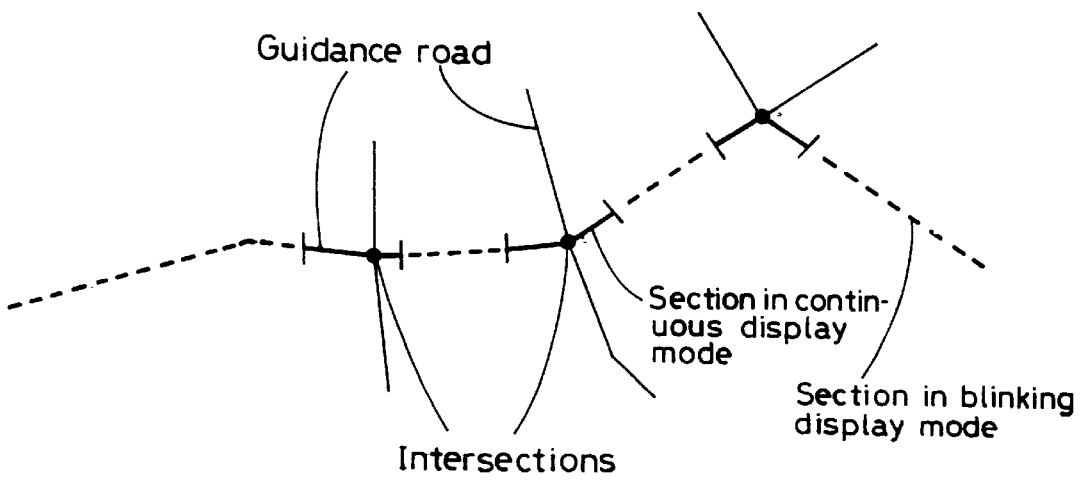
FIG. 19 illustrates a further embodiment of the invention, which lets the system to select between the blinking and continuous display modes depending on road data during travel.
Figure 20:
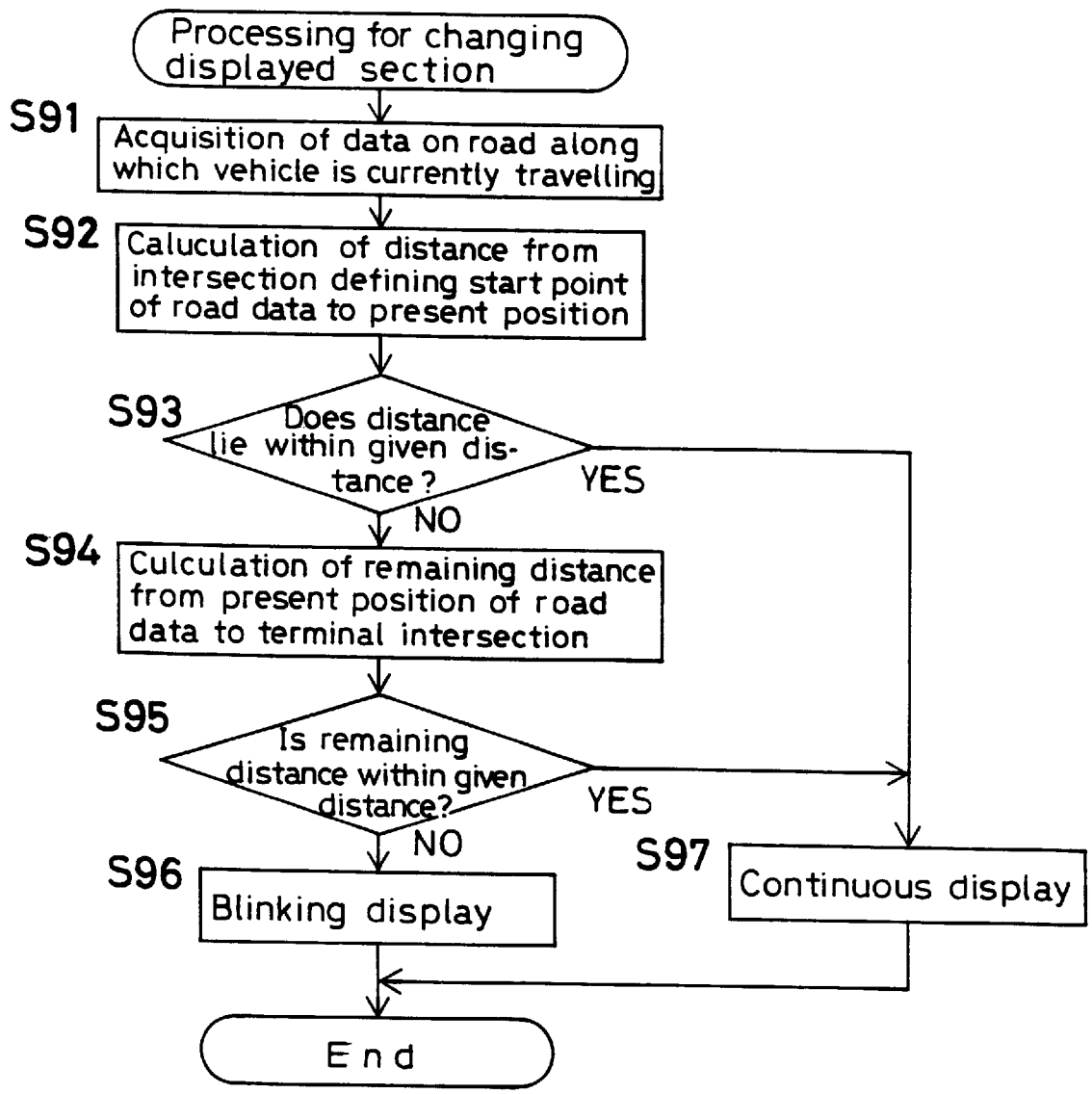
FIG. 20 illustrates how the system selects between the blinking and continuous display modes depending on road data during travel.

Moreover, the user may select between the blinking and continuous display modes depending on data on the road along which the vehicle is traveling. In other words, when the vehicle travels within a given range spaced a given distance away from an intersection, as shown in FIG. 19, the display of the present position mark is switched over to the continuous mode, and outside that range the present position mark is displayed in the blinking mode. Referring to the processing in this case, data on the road along which the vehicle is traveling is first acquired (Step S91), as shown in FIG. 20. Then, a distance from a starting-intersection point of that data to the present position is calculated (Step S92) to judge whether that distance lies within the given, or predetermined, distance (Step S93). If that distance lies within the given distance, then the present position mark is continuously displayed (Step S97), and if it does not lie within the given distance, then the remaining distance from the present position to a terminating-intersection point of the road data is calculated (Step S94) to judge whether the remaining distance lies within the given distance. If, in this case, the remaining distance lies within the given distance, then the present position mark is continuously displayed (Step S97), and if it does not lie within the given distance, then the present position mark is displayed in the blinking mode (Step S96). Especially on streets having a lot of congestion or businesses, contained in a large amount of data, the vehicle must often travel at low speed due to a traffic snarl or for other reasons. With the present position mark continuously displayed in such an area, it is difficult for the driver to recognize and, hence, monitor the state of vehicle movement thereof, because it remains perceptually invisible on the map containing much data. For this reason, the present position mark is displayed in the blinking mode except in the vicinity of the intersection. In the vicinity of the intersection where precise position data must be acquired, the present position mark is continuously displayed. It should be noted that immediately after the vehicle traverses an intersection, the present position mark may be continuously displayed. In a system designed for performing route guidance, it is necessary to display the enlarged intersection map at a given distance before arriving at the intersection to be properly guided therethrough. In this case, the present position mark is displayed in the continuous mode as mentioned before, after the driver has chosen to display the enlarged intersection map. However, a system designed to select no enlarged intersection map may be controlled such that the display of the present position mark is switched over to the continuous mode when the vehicle reaches a given distance away from the intersection to be passed through to facilitate guidance.

It is to be understood that the instant invention is never limited to the aforesaid embodiments, and so many modifications are possible. In the aforesaid embodiments, selection is made between the blinking display mode and the continuous display mode depending on whether the vehicle is in motion, the kind of the map displayed, the speed of the vehicle, the road data, or other factors affecting human perception. However, these may be used in combination of two or more factors. When the map used is an enlarged intersection map or a map larger than the given magnification, the present position mark is displayed in the blinking mode. Even when a residence zone map is used, however, it is possible to display the present position mark in the blinking mode.

As can be seen from the foregoing explanation, the instant invention enables the present position mark of the vehicle to be displayed either in the continuous mode or in the blinking mode on the map depending on the state of travel or the situation of the present position and, hence, makes it possible to eliminate difficulty involved in recognizing the state of movement of the present position mark or in monitoring the present position mark that is liable to remain perceptually invisible because the map contains a lot of data. According to the instant invention, the system is designed such that the present position mark is displayed in the blinking mode while the vehicle is at a stop, and in the continuous mode while the vehicle is in motion. When the map used is a wide-area map or the vehicle travels at low speed, the movement of the present position mark across the display screen is slow. In this case, the display mode of the present position mark is switched over to the blinking mode. Moreover, when it is substantially unnecessary to provide any real-time recognition of the present position because the vehicle is far away from the vicinity of an intersection, the display mode of the present position mark is switched over to the blinking mode. Thus, it is possible to prevent the map information from remaining invisible by the present position mark and, hence, to easily recognize the map information on surrounding areas of the present position even when it is positioned under the present position mark.

Then, reference will now be made to a system capable of setting the en-route location desired to be traversed.

As previously discussed, the system includes a destination setting means made up of input/output processing means comprising a CPU 40 for running a program relating to destination setting processing, which is loaded in a first ROM 41, a touch switch 11 and display 12 of an input/output device 1 for performing entry of a destination and output of a map display, an image processor 45 for performing display processing for displaying a map, and an interface 47 for loading a destination input signal from the touch switch 11 into the CPU 40. The desired en-route location setting means is made up of the CPU 40 for running the program relating to the en-route location setting processing, which is loaded in the first ROM 41, and the aforesaid input/output means for setting the en-route location desired to be traversed.

In particular, the program relating to the desired en-route location setting processing possesses a retrieval function for retrieving roads lying within a given range with respect to the desired en-route location on the basis of the location desired to traversed, a function for setting a condition for the location desired to be traversed with respect to the retrieved roads, a function for offering a selection within the retrieved roads on the basis of the set condition for the location desired to be traversed, a function for forcibly transferring the location desired to be traversed onto the road on the basis of the selected road, and a function for displaying a transit point on the road in connection with the aforesaid location transfer processing, such that the transit point is displayed on the set point, or when the set point is not found on a guidable road, the transit point is displayed on a road nearest thereto or an intersection or branch point nearest thereto. The route search means is made up of the CPU 40 for running a program relating to route finding, which is loaded in the first ROM 41.

In the instant system, an estimated position is calculated on the basis of signals from various present positions detection sensors and GPS data. Then, the estimated position is correlated with roads on a map and the GPS data to determine a position on the roads corresponding to the present position. The instant system has an added function of collating the present position with a route to the destination to judge whether the position of the vehicle on the road approaches a preset guidance point. In other words, by the aforesaid function it is determined when automatic voice outputs of a given distance in front of an intersection on the guidance route and results of whether the intersection is traversed, and intersection information such as names of intersections are to be displayed or output. On the basis of the results of such judgments, guidance instructions are sent to the image processors and the voice processor. Upon entry of a request signal, present position voice guidance is given to the voice processor. In the instant system, voice guidance is fed out of a voice output unit where sound data, such as phrases, single sentences, and sounds, read out of the information storage device 3 is combined and converted into analog signals.

The data structure relating to the setting of the destination with the desired on-route location setting function will be described. Road data is, for example, a set of straight -Lines connecting nodes at both ends, and is composed, for each node, the number of roads communicating therewith and the angles of the respective roads. Guidance roads to the destination are numbered in order from the road initially traveled from a starting-point, and numbers are assigned to all roads connecting to the road at branch points, merge points, and intersections. Based upon the assigned road numbers, road guidance is determined under the prescribed conditions. Thus, the guidance route is composed of a plurality of guidance roads with data regarding such guidance roads stored in memory.

An account will be given of the data structure forming the guidance roads, which is loaded in the information storage device 3 for each road. Referring to FIG. 12, the guidance road data is defined by, for each road, a road number, length, road-attribute data, shape data address and size, and guidance data address and size. The shape data represents the shape of each road by the number of nodes, each node defined by a coordinate system of east longitude and north latitude. When, for the calculation to display the remaining distance to a guidance intersection, the angle of intersection between roads is used as information regarding the road to be next traveled, and information regarding an angle at which the road currently being traveled intersects the road to be next traveled is added to the shape data.

The guidance data is defined by an intersection name, precaution data, road name data address and size of road-name voice data, and address and size of destination data. The destination data is defined by a destination road number, a destination name, the address and size of destination-name voice data, destination direction data, and travel guidance data. The destination direction data is defined by invalidity, disuse, straight ahead, right direction, diagonally right direction, left direction, diagonally left direction, and direction returning to left.

When guidance is performed at a branch point or an intersection, the destination data in the collection of guidance road data is retrieved to determine the content of the route guidance to be output (a guidance expression added primarily to a fixed guidance expression) based upon the destination data. The destination data is a kind of data added as when there are smaller angular differences between a plurality of roads extending, especially from branch points, where difficulty is involved in the determination of direction with the sole use of an angle of the direction of leaving an intersection, for instance, expressway exits.

Various data forming a collection of the aforesaid guidance road data will be described. The road-attribute data is composed of data indicating whether a road is an overpass, a road alongside an overpass, an underpass or a road alongside an underpass, and data indicating information regarding the number of lanes, for instance, regarding whether the number of lanes is three or more, two, or one with or without a center line. It is to be noted that when the road is a branch road extending from an overpass, it is designated as being "alongside an overpass." This will also hold for a tunnel.

The road name is defined by road category and road classification numbers. The road category is broken down into, for example, expressway, municipal expressway, toll road, and general road such as national road, and prefectural road. Especially the expressway, municipal and toll roads are defined by a main road and an ancillary road. An ancillary road is defined as being a road making a connection between the general road and the main road and between the main roads.

The precaution data is a kind of data for providing the driver with information for calling a driver's attention to changes in the state of the road, and is defined by railroad crossings, tunnel entrances, tunnel exits, points of reduced road width, and "none", as examples.

The travel guidance data is a kind of data provided to the driver while the vehicle travels along a road of large width or a road having two or more lanes so as to ensure that the vehicle can travel in safety according to the next travel guidance. For instance, when the vehicle turns to the right or changes course in a diagonally right direction, the data indicates information instructing the driver to "bear right" or "bear left." When the vehicle traverses an intersection, i.e., straight ahead, the data indicates information instructing the driver to "bear center" or naturally follow the road straight ahead, and do "nothing" when guidance is not necessary.

Figure 21:
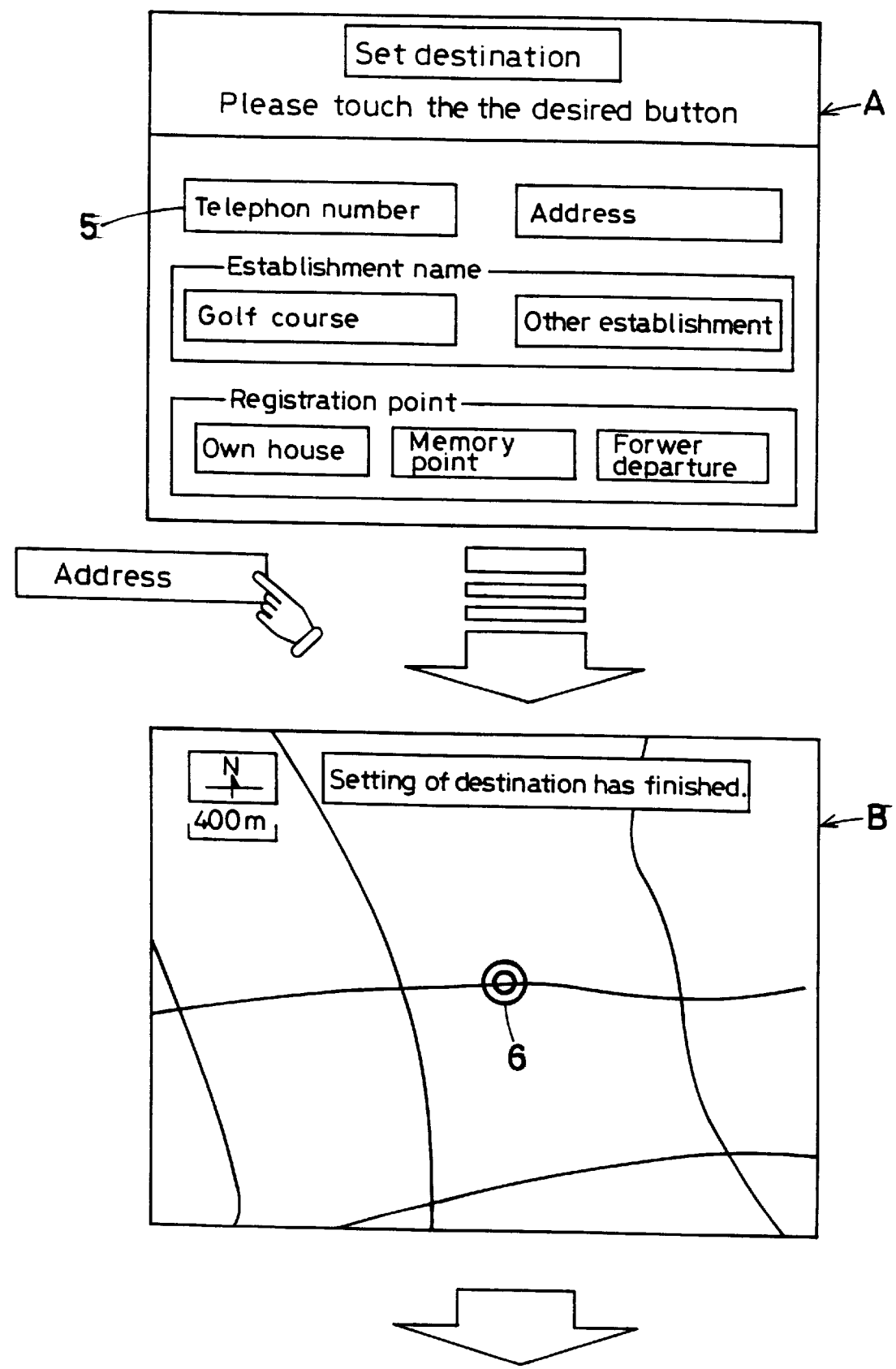
FIG. 21 illustrates one example of a destination setting display screen and a map display screen opened after the setting of the destination.

To enter, or set, the destination, the selection operation is repeated using a list of institutions or facilities to derive a registered destination pre-stored in the storage device so that the registered destination is set as the desired destination. Alternatively, a desired point may be set as the destination by scrolling through a map with respect to the point of the registered destination. FIG. 21 illustrates one example of the screen used to select destination settings. A destination setting screen A is designed to select a destination based on telephone numbers, addresses, names of establishments, and registration points and a function key 5 is provided to this end. Provided for the names of establishments is a key for selecting a golf course and other establishments, as shown in FIG. 21 as an example. Also provided for the registration point is a key for selecting a driver's own house, memory point, and the point of departure. When these keys are pressed, the content of what is registered regarding the establishment list or the registration point is displayed, so that the destination can be set by performing an operation following a message displayed on the screen. To confirm that the setting of the destination is finished, a map screen (confirmation screen) is then displayed, giving a message that the setting of the destination is finished and allowing a destination setting mark 6 to appear on the map. After the lapse of a given time from the appearance of this confirmation screen, a search condition setting screen C is opened, as shown in FIG. 2.

In setting the destination, a route search enabling the destination to be reached within a minimum time and at a minimum distance is usually performed. However, a route search with added conditions that the user desires may also be performed. FIG. 22 illustrates one example of a search condition designating screen which is opened when the key for addresses and so on is pressed on the destination setting screen (FIG. 21) or, simply put, after the destination has been set. In the following explanation of the location desired to be traversed, the term "transit point" will be used. Search conditions are chosen such that a transit point and a toll road can be designated. Provided on the search condition screen C is a key 51 to offer "designation" or "no designation" of the transit point, and give a "preference" or "no preference" to the toll road. When the search condition for the transit point or the toll road is set, "designation" or "preference" is selected. Upon selecting the transit point "designated" for instance, a transit point setting screen D is opened. Telephone numbers, addresses, names of establishments, and registered points are provided on this screen D in the form of a key 52 for setting the point to be traversed. This transit point menu is much the same as the destination setting menu on the destination setting screen A with the exception of the "driver's own house" and the "former departure" in the registration point.

For instance, when the "addresses" are selected on the transit point (desired location) setting screen D, the names of addresses are entered, which are classified according to the structure of an address system. In other words, an address input screen is composed of a plurality of sub-screens E to H, so that the names of addresses classified according to the structure of the address system can be designated successively from the top. All the address input sub-screens include a pre-designated address display section 53 for displaying the name of the item selected on the former screen, and an address display section 54 for displaying a list of addresses subsequent to the address designated on the former screen in the order of the katakana syllabary, or syllabary appropriate to the language of the driver, together with an address key 55 for selecting the addresses displayed on the address display section, a scroll key 56 for scrolling through the address list displayed on the address display section in the order of the appropriate syllabary, a front key 57 and a next key 58 for displaying a give number of the former or next address data relative to the currently displayed address data in skip fashion, and a return key 59 for allowing the currently displayed screen to go back to the former screen. The "address" selected on the transit point setting screen D is displayed in the pre-designated address display section on the initial screen E for entry of addresses, shown in FIG. 23.

Figure 24:
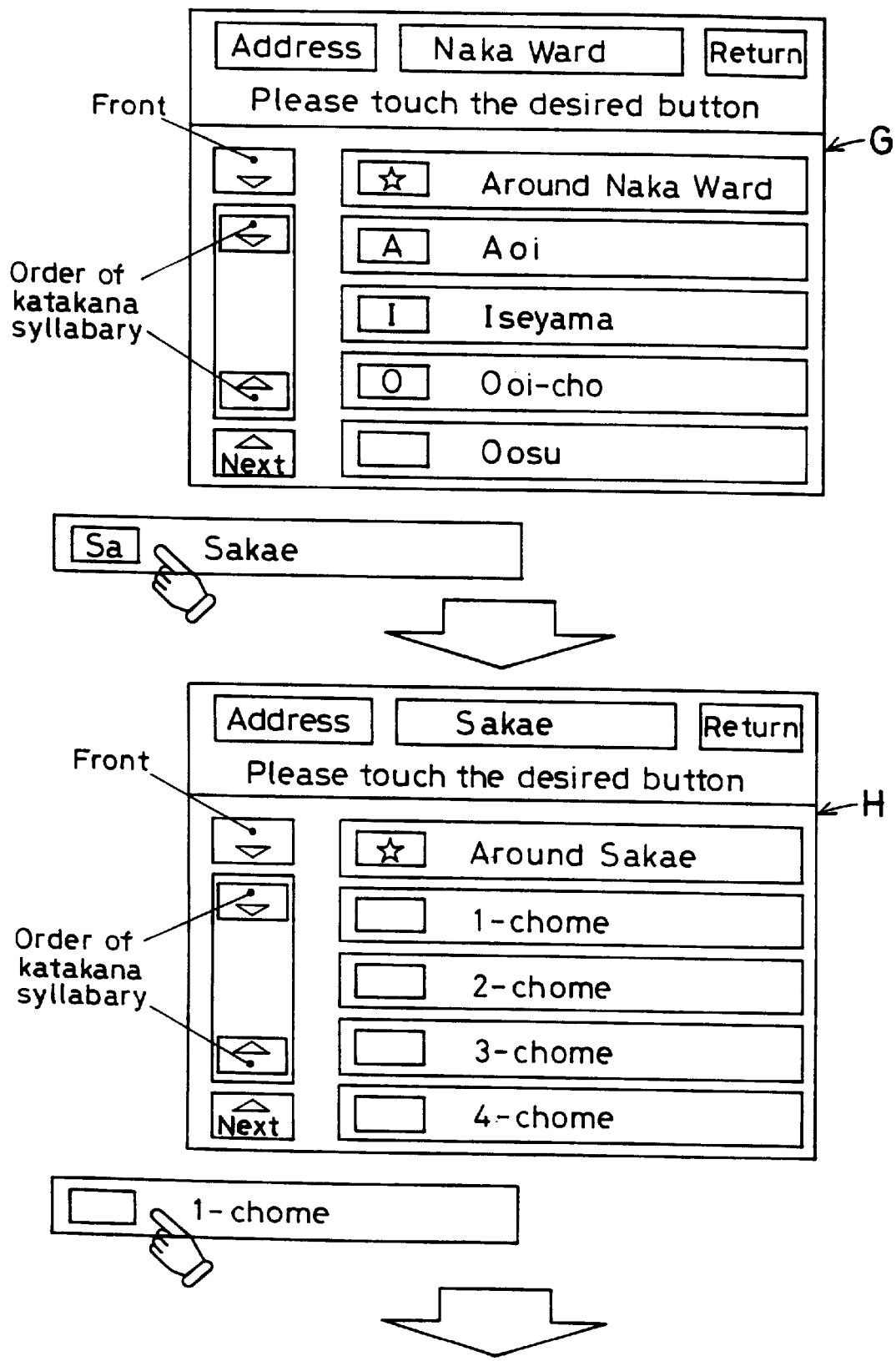
FIG. 24 illustrates one example of an address input display screen appearing after the screen of FIG. 23.

The initial screen E is scrolled through using the scroll key until the name of the address to be selected appears, and by touching a marker portion of the displayed address, an address input screen F for entry of the names of districts, cities, towns, and villages subsequent to the address is opened. On the basis of an address selected on the address input screen that is similarly displayed, a large-section designation screen G and a subsection designation screen H, each shown in FIG. 24, are successively opened for entry of addresses on the respective screens. On the basis of the subsection selected on the subsection designation screen H, a detailed map screen I is opened, which has a peripheral area map of the subsection displayed thereon, as shown in FIG. 25. In the peripheral area map of the subsection, coordinates of a typical point thereof are loaded corresponding to the subsection point, so that the map can be displayed with respect to the coordinates of the selected point. An invisible large-section "Sakae" is selected on the large-section designation screen G; this means that the large section "Sakae" has been selected by scrolling through the screen display using the scroll key.

Referring to FIG. 25, the detailed map screen I contains a set key 62 for moving a cursor 61 to the transit point on a map 60 so that the center of the cursor can be st as the transit point, and a return key 63 for allowing the currently displayed screen to go back to the subsection designation screen H, with a cursor mark displayed in the map, the cursor mark composed of eight cursor moving marks 61B arranged concentrically around a circular cursor position mark 61a and at equidistant intervals. By touching any desired one of the cursor moving marks 61b, the cursor mark can be moved in a direction indicated by the arrow which is touched. When the transit point is set on the map with the cursor mark positioned on only one road, it is set on that road. As illustrated, however, the cursor mark (cursor position mark 61a) is often positioned astride a plurality of roads, for instance, an expressway and a general road, or a plurality of general roads. In such a case, it is required to set either the expressway or the general road as the transit point, or either one of the general roads as the transit point. The transit point condition for determining which of the roads is selected as the transit point is designated on a transit point condition setting screen J which is opened by pressing the set key 62 after the cursor mark has been located in the vicinity of the transit point.

Figure 26:
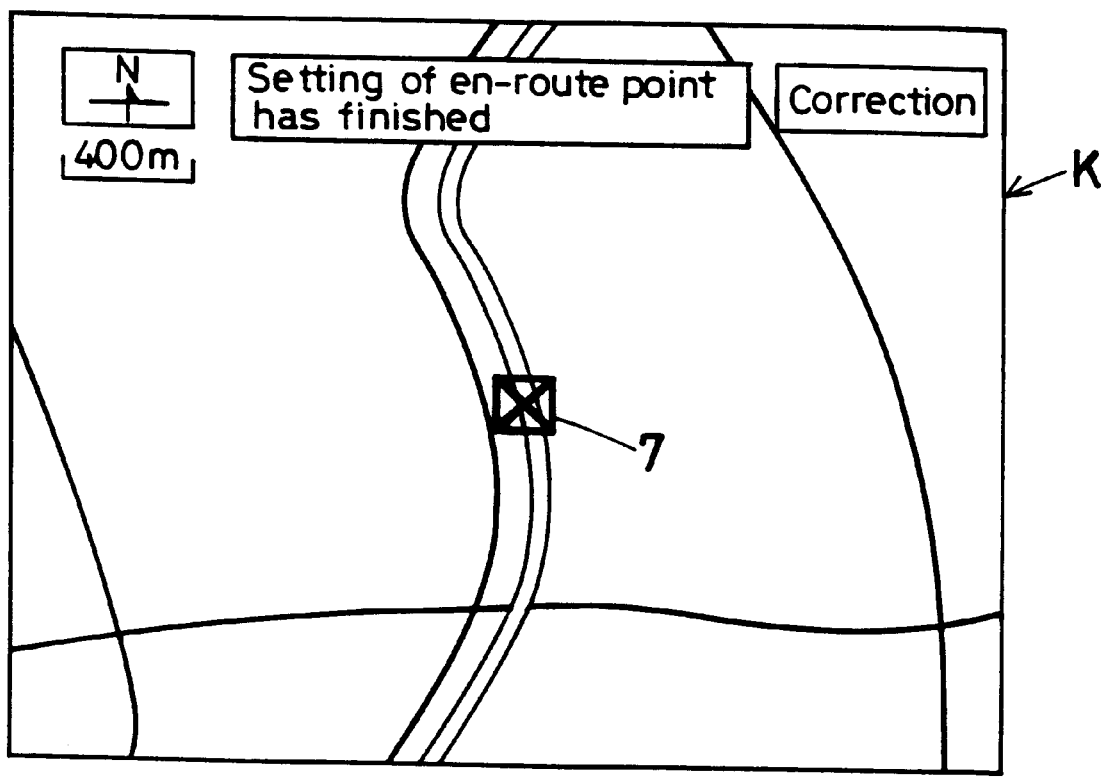
FIG. 26 illustrates one example of a detailed map display screen which appears following the screen FIG. 25, and after the transit point thus set.
Figure 27:
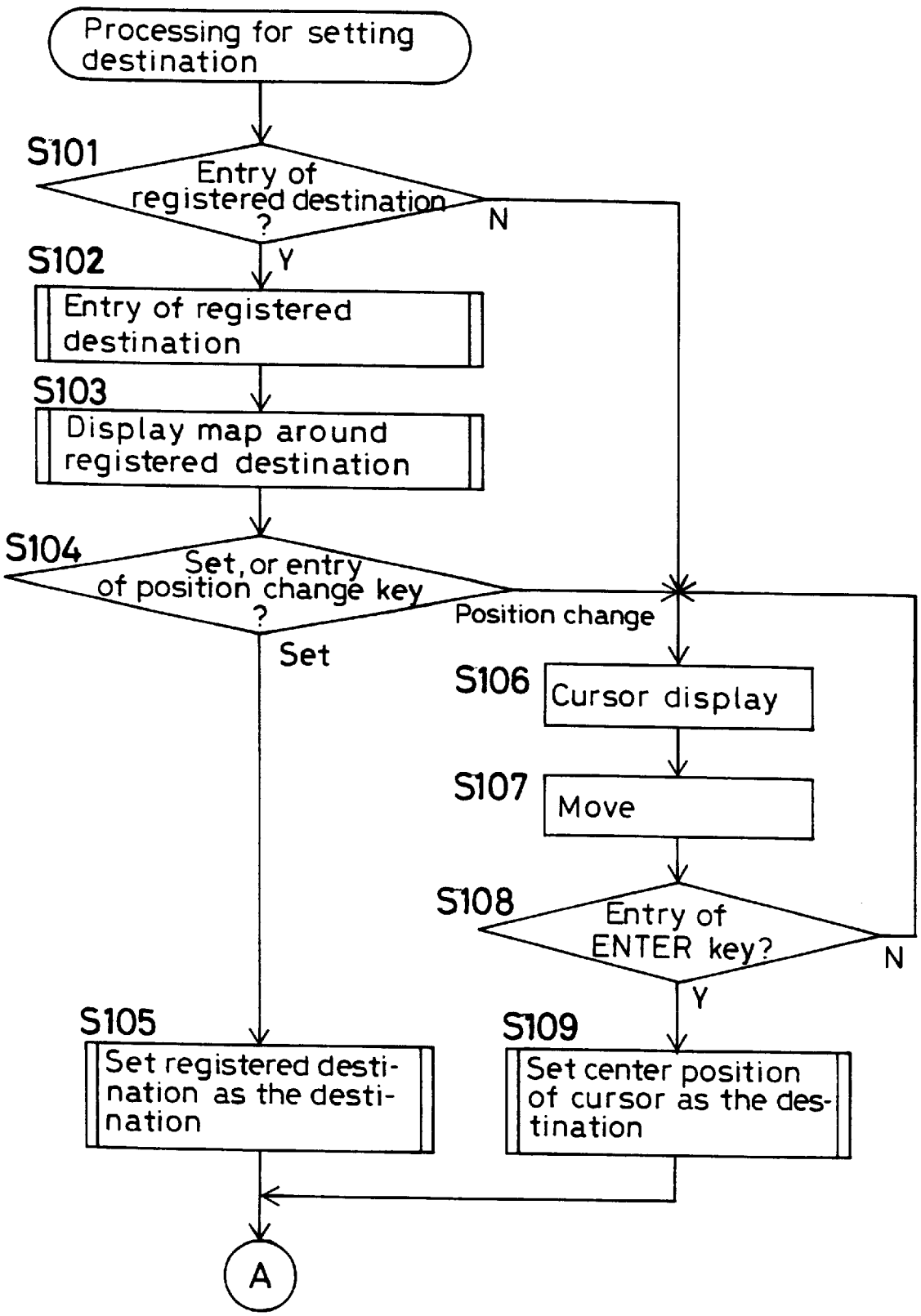
FIG. 27 is a flow diagram illustrating how the destination is set.

The transit point condition setting screen J is provided thereon with a key for displaying road information selected as the transit point when there are a plurality of roads in the vicinity of the cursor mark on the detailed map I, and setting the transit point. In the illustrated embodiment, the road information is displayed with a selection key 64. For instance, it is shown that Nagoya Expressway and National Road No. 1 are found in the vicinity of the transit point. On the screen shown in FIG. 26, it is displayed that the setting of the transit point has finished, with the transit point setting mark 7 marked on the expressway. On the basis of a correction key 65 pressed on this screen, the screen shown in FIG. 27 goes back to the detailed map screen I shown in FIG. 25, so that the position of the transit point can be again set.

Two methods are available for displaying the destination and transit point to achieve guidance based on the set points; in one method the entered point is displayed as the transit point or destination and they are set on a point on the selected road in actual processing for implementing guidance, and in another method the display of the transit point or destination is transferred onto the selected road. The instant invention may be applicable to both the display and guidance methods.

The processing sequences for setting the destination including the transit point will be described. First, processing for setting the destination is explained with reference to FIGS. 27 and 28.

In the destination setting processing, entry of the registered destination is judged (S101), and the following processing is done on the basis of the result. When the registered destination is entered, data on the registered destination and map data including the registered destination are acquired (S102) to display a map having a center located at the registered destination (S103). If the mark displayed on the map is the desired destination, then the set key is pressed (S104), so that the registered destination can be set as the destination (S105). When it is desired to change the position of the destination displayed on the map, a position change key is pressed to display the cursor (S106).

When something other than the destination, for instance, a telephone number is entered, retrieval is executed on the basis of the entered telephone number, and map data on that point is acquired to display the cursor on the map (106).

From the judgments at Steps S101 and S104, the destination is set with the cursor displayed on the map. This is executed by touching the arrow cursor to move a center position of the cursor to, or in the vicinity of, the destination (S107) where the point is entered by means of the ENTER key (S108). Thereafter, the center position of the cursor is set as the destination (S109). After the setting of the destination has finished, processing for displaying the confirmation screen (not illustrated) is executed to thereby confirm the destination set by the confirmation screen. Following this, the screen for designating the search condition is displayed (S110). The selection of the transit point is judged (S111), and the destination setting processing is finished when a transit point is not designated. When a transit point is "designated," it is judged whether entry of the registered point is entered using the list of registered points (S112). When the transit point is designated by something other than identification of a registered point, the setting processing is performed by the entered transit point (S117). Upon entry of the registered point selected and the registered destination entered (S113), data on the registered destination is acquired to display a map having a center located at the registered destination (S114). If the mark displayed on the map is the desired destination, then the set key is pressed (S115), so that the registered destination is set as the transit point (S116). When it is desired to change the position of the registered destination displayed on the map, the position change key is pressed to move the cursor so that the point to be entered is determined to set the point as the transit point (S117).

Figure 29:
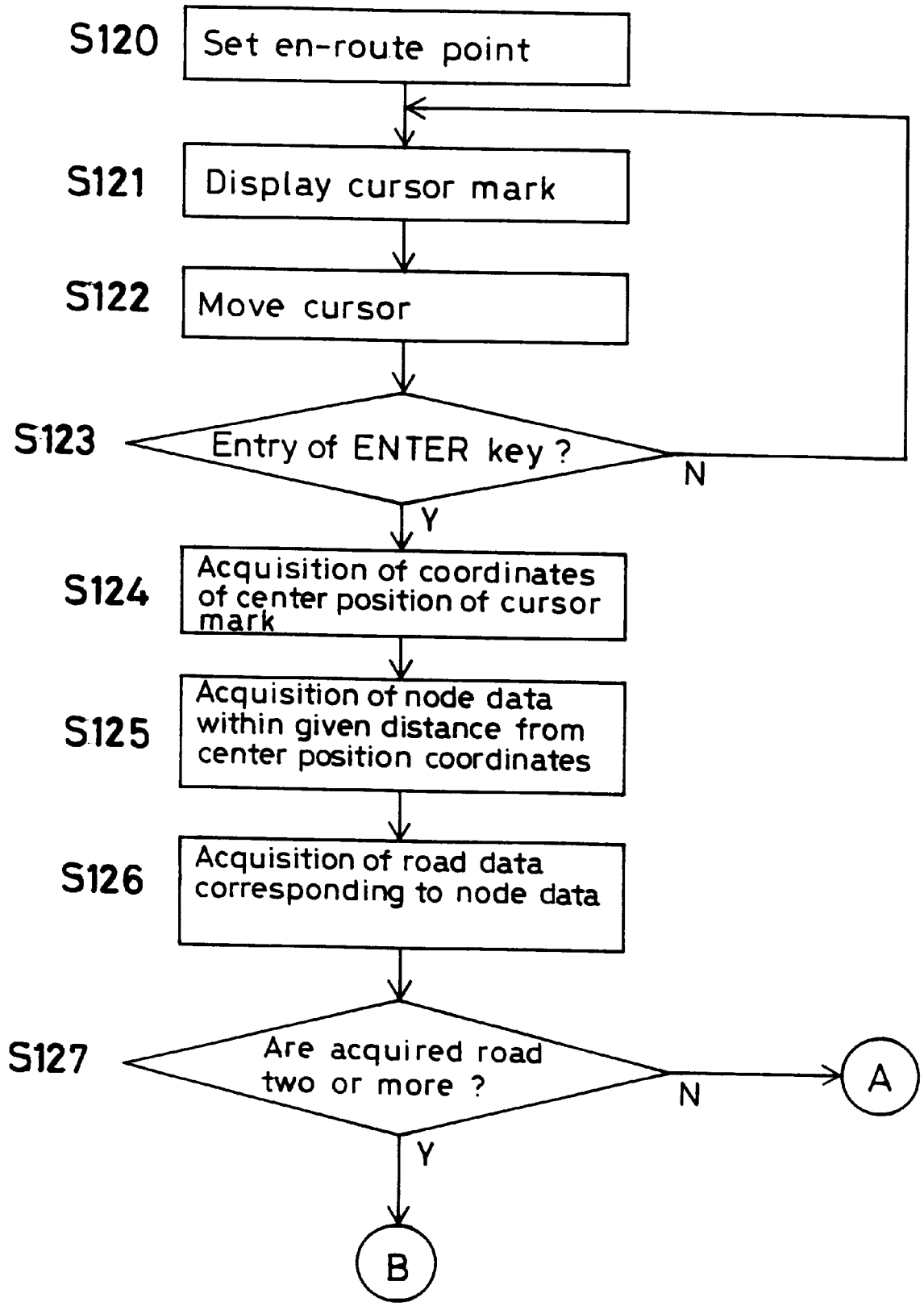
FIG. 29 is a flow diagram illustrating how the transit point is set.
Figure 33:
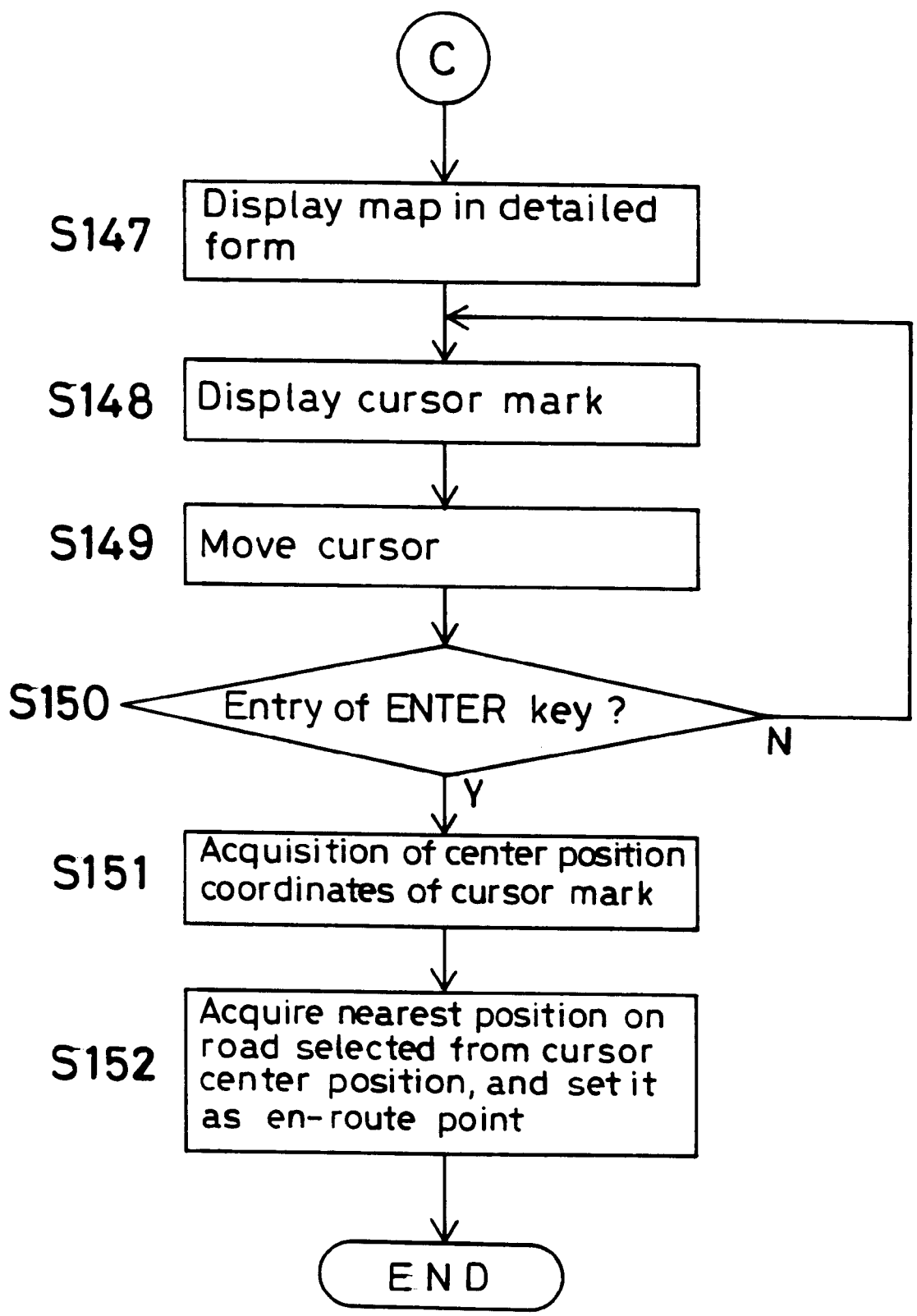
FIG. 33 is a flow diagram following the flowing diagram of FIG. 32.

The processing for setting the transit point at Step 117 will be described with reference to FIGS. 29 and 33. Here, assume that the range of a road to be retrieved for the location desired to be traversed lies within a prescribed distance as found from the entered point. Referring first to FIG. 29, the destination and transit point-setting input operation is performed by the procedure selected by the destination setting screen (S120). Thereupon, a cursor mark is displayed on a map (S121). If the cursor mark is found on the selected road, and ENTER (set) key is pressed (S123). On the other hand, if the cursor mark lies astride of a plurality of roads or between a plurality of roads, or if another road is selected, the cursor mark is moved (S122). That is, the cursor mark is moved to the vicinity of the transit point by touching a cursor moving mark. When the ENTER key is pressed (S123), coordinates of a center position of the cursor mark are acquired (S124), and node data within a prescribed distance form such coordinates and road data corresponding to such node data are acquired (S125 and S126). The number of the thus acquired roads is determined (S127). If there are two or more roads, then Steps S131 and following, shown in FIG. 31, are performed. If the number of the roads is less than two, on the other hand, the transit point is set by the processing shown in FIG. 30.

Figure 30:
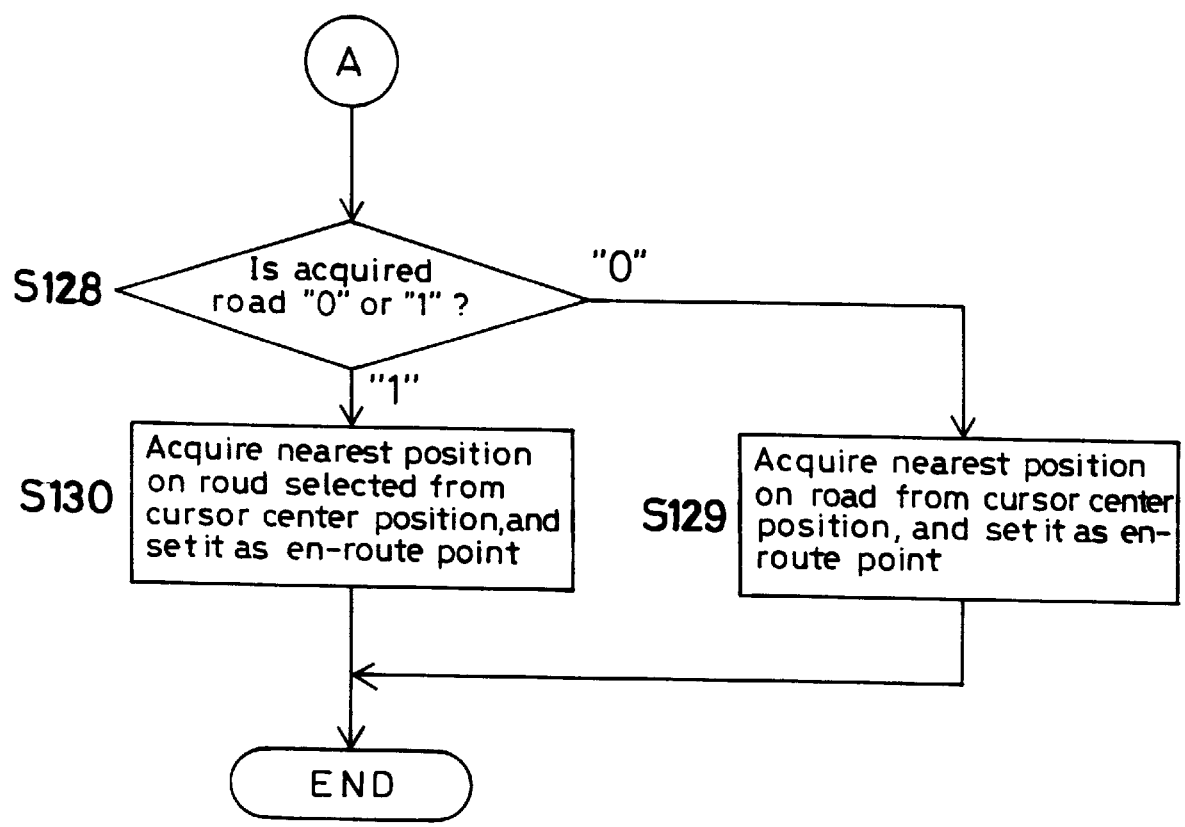
FIG. 30 is a flow diagram following the flow diagram of FIG. 29.
Figure 31:
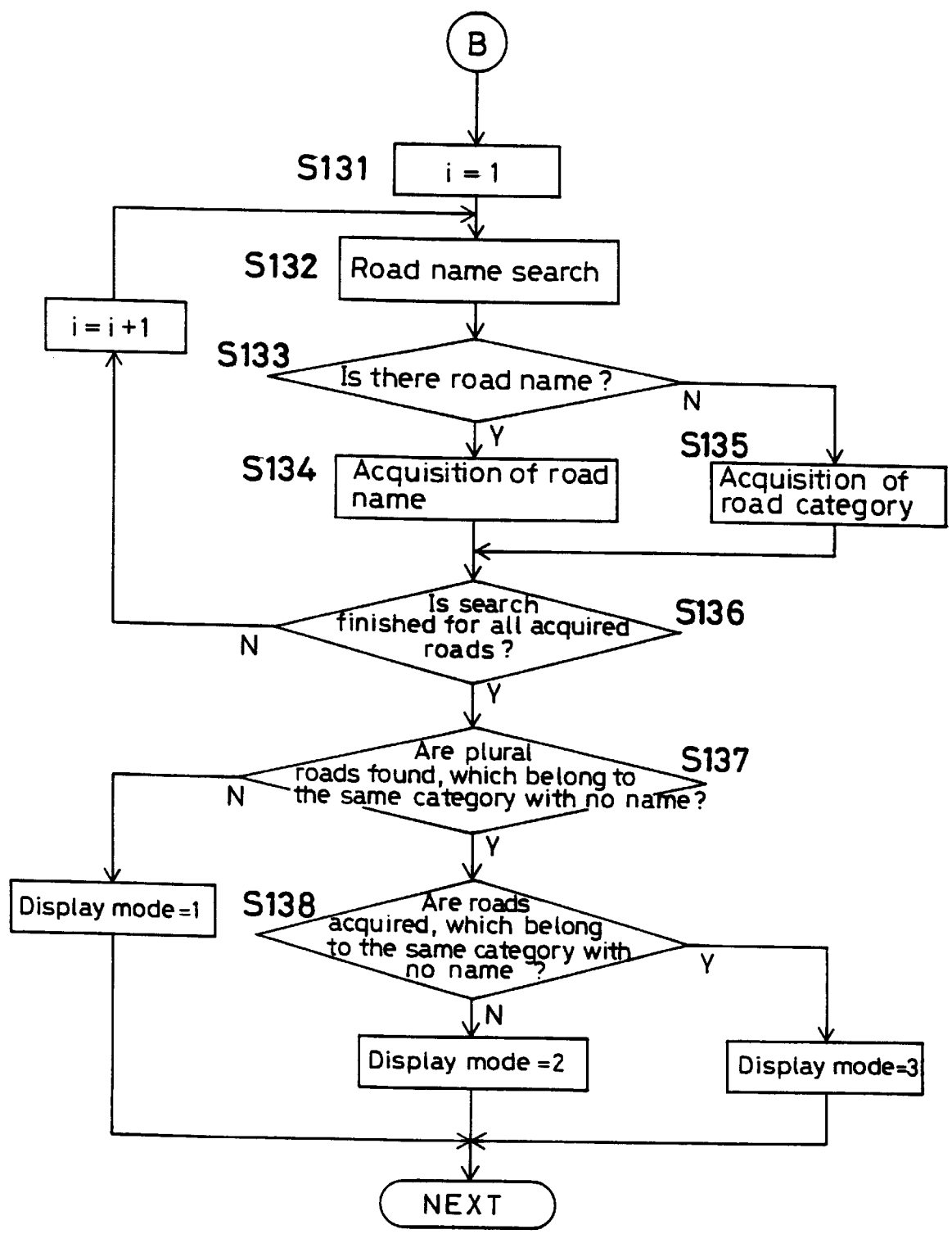
FIG. 31 is a flow diagram following the flow diagram of FIG. 29.

Referring to FIG. 30, it is judged whether the acquired road is "0" or "1" (S128). If the road is judged to be "0", then a position on the road that is farthest off the center position is acquired, and set as the transit point (S129). If the road is judged to be "1", on the other hand, a position on the selected road that is nearest to the center position of the cursor is acquired, and set as the transit point (S130).

When the number of the acquired roads is two or more, transit points are set for all the roads depending on their name and category. First, i=1 is set (S131) so that the names of the acquired roads are retrieved (S132) to judge whether they have their own names (S134). For the roads having their own names, the road names are acquired (S134) and for the roads having no name, the road category is acquired (S135). The thus acquired roads are processed at Steps S132 to S135 (i=i+1). When retrieval is finished for all of the acquired roads (S136), display MODE processing is executed for the retrieved roads.

Figure 32:
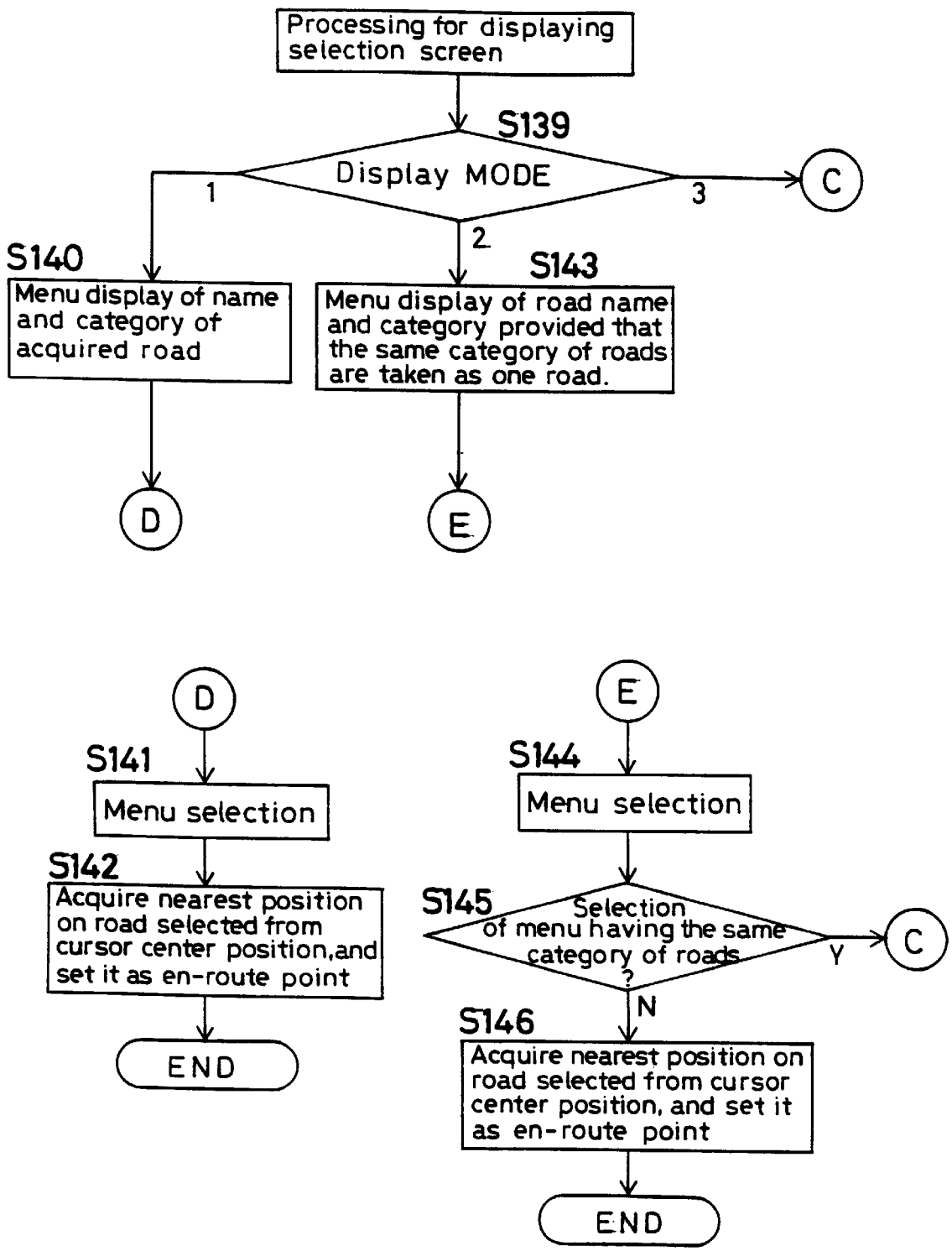
FIG. 32 is a flow diagram of selection display screen processing.

For the roads acquired by the aforesaid processing, it is judged whether a plurality of combinations of roads having no name and roads belonging to the sam category are acquired (S137). It follows that if the acquired roads are three roads, one Nagoya Expressway, one a prefectural road (with no name), and one a prefectural road (with no name), a further determination is then made about the category of the individual road (S138). If the acquired roads are three roads, one Nagoya Expressway, one Prefectural Road No. 3, and one a prefectural road (with no name), then display MODE=1 is set. When it is found from the results of judgment at Step S138 that all the acquired roads have no names and do not fall within the same category, then display MODE=2 is set, and if not so, then display MODE=3 is set. With the display mode determined, the process for displaying the selection screen is done as shown in FIG. 32. The display MODE determined at Steps S137 and S138 is judged (S139) to perform menu display processing for each display MODE.

Figure 34:
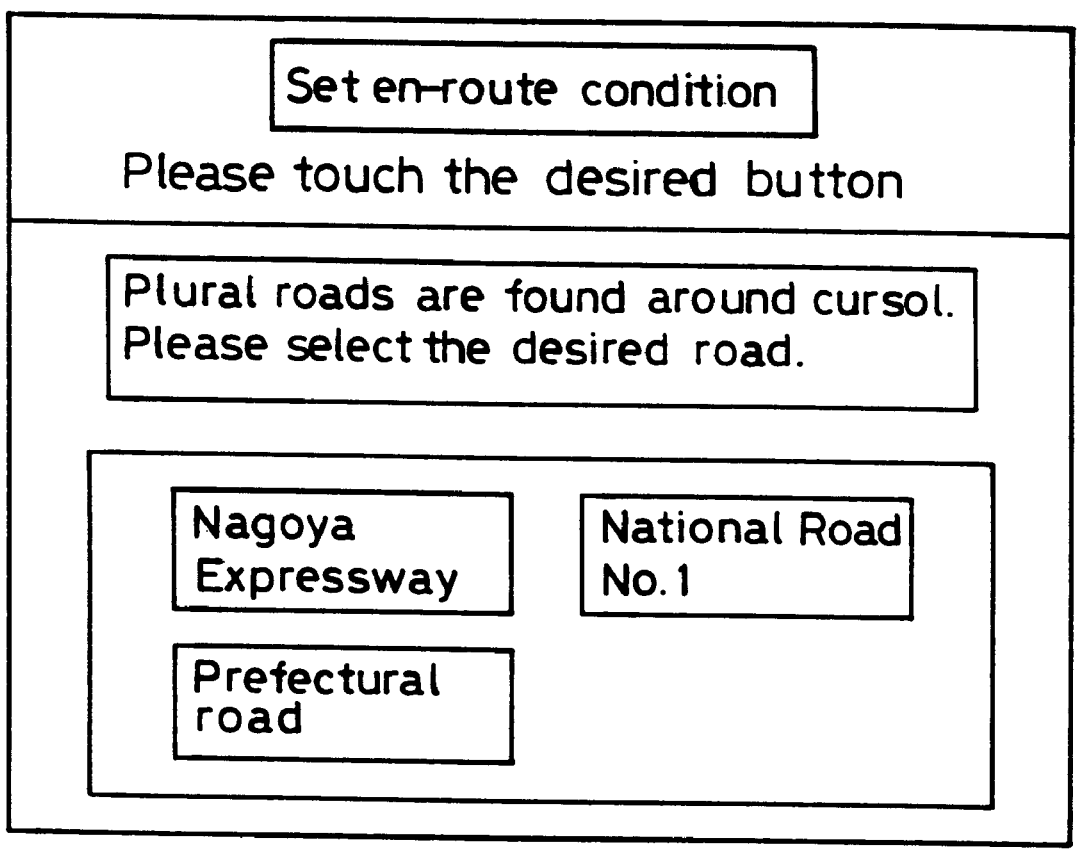
FIG. 34 is an exemplary illustration of display MODE=1.

In the case of the display MODE=1, the road name and category (e.g., national, and prefectural roads) have been acquired, and so the road name and category are displayed in menu forms (S140), as shown in FIG. 34 as an example. With the displayed road selected (S141), a position on the selected road that is farthest off the center position for a cursor is acquired, and set as the transit point (S142).

In the case of the display MODE=2, roads belonging to the same category are taken as being one road, and displayed in menu form (S143) according to the road name and category. Upon the displayed menus selected (S144), it is judged whether the selected menus are the same category of plural menus (S145). If the same category of plural menus are not selected, when a position on the selected road that is farthest off the center position of the cursor is acquired, and set as the transit point (S146). If the same category of plural menus are selected, then a detailed map is displayed. Referring here to FIG. 33, the map is displayed is in the form of a detailed map (S147), on which a cursor mark is displayed (S148). If the cursor mark is found on the road to be selected, then an ENTER key is pressed (S150). On the other hand, if the cursor mark lies astride a plurality of roads or between a plurality of roads, or if another road is selected, the cursor mark is moved (S149). That is, the cursor mark is moved to the vicinity of the transit point by touching a cursor moving mark. When the ENTER key is pressed (S150), coordinates of a center position of the cursor mark are acquired (S151), so that a position on the selected road that is nearest to the center position of the cursor can be acquired and set as the transit point (S152). When the cursor is not found on the road, a position on the road that is nearest to the position of the cursor at the time input from the ENTER key is accepted may be set as the transit point.

An account of the case where the display MODE=3 is not given because the processing therefor is similar to that (FIG. 33) for the case where the same category of plural menus are selected at the aforesaid step S145.

A specific embodiment of the display MODE=2 will be described. The instant embodiment is directed to a case where among roads lying within a prescribed distance from a center position of a cursor mark there are a plurality of roads that fall within the same category but have their own names. In such a case, as shown in FIG. 35, the cursor mark lies astride an expressway and two prefectural roads. When a set key is pressed in this state, a traversal condition setting screen is opened. The expressway is displayed in terms of road name and road category, while the two prefectural roads are displayed in terms of one road name because they belong to the same road category. Here, on the basis of the prefectural roads selected, a map is displayed in the form of a detailed map as shown in FIG. 37. Then, the cursor mark is moved to either one of the two prefectural roads to press the set key, whereby the transit point is set while a transit point setting mark and a message indicating the completion of the setting of the transit point are displayed on the map on the screen. When it is necessary to change the position of the transit point or transfer the transit point onto other road after the transit point has been set, a correction key is pressed to open the screen shown in FIG. 36, on which a position change mark is pressed to move the cursor to a desired position to press the set key for resetting purposes.

Figure 38:
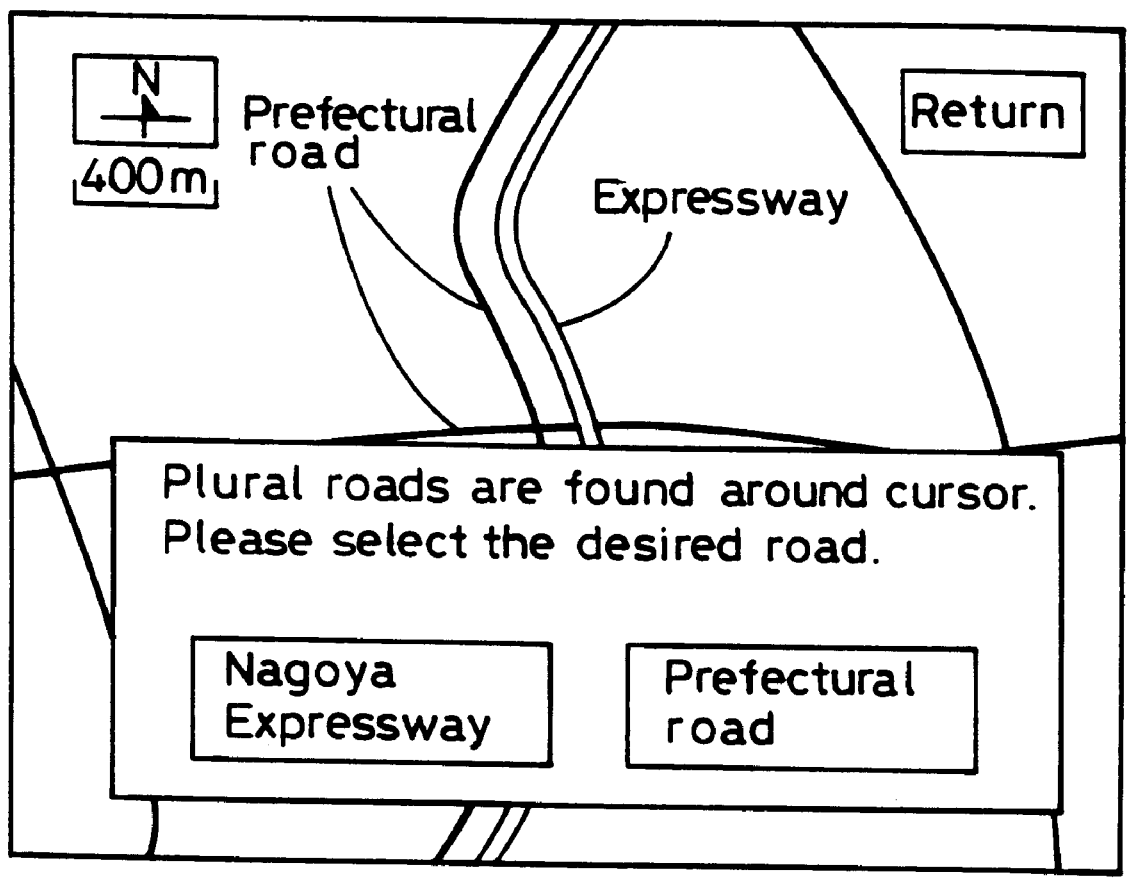
FIG. 38 illustrates one example of the transit point setting condition superposed on the detailed map display screen.

The aforesaid embodiment is directed to the setting of the transit point condition in the case where there are a plurality of roads belonging to the same category but not having their own names, wherein the set key is pressed on such a detailed map as shown in FIG. 35, the transit point: condition setting screen is displayed. However, it is to be understood that the transit point condition may have previously been set while the setting of the transit point condition is superposed on the detailed map, as shown in FIG. 38.

It is also to be understood that the invention may be applicable not only to the setting of the transit position but to the setting of a guidance point as well. FIG. 39 illustrates a specific case where the guidance point is set on a toll road. Two methods are available to display a destination setting mark, one wherein when the destination is set (i.e., a cursor is moved to offer a selection within points on a map for setting purposes), the mark is displayed on the selected point, and the other wherein the mark is displayed on the guidance point, i.e., the final guidance point set corresponding to a point entered on a map). Herein, the destination setting mark is displayed on the former method.

With the cursor mark located on the toll road, the set key is pressed so that a guidance point condition setting screen is opened. On this screen, whether the guidance point is set on the toll road is determined depending on whether the destination is found within a section of toll road. For instance, when there are noted places, places rich in historical association or spots with wide prospects, and hotels and inns alongside the toll road, and one of them is a user's destination, the guidance point is set on the toll road, and when the destination does not lie alongside the toll road, the guidance point is set on a general road. When "No" is selected, the guidance point is set on a position on a general road that is nearest to the center position of the cursor mark.

Figure 40:
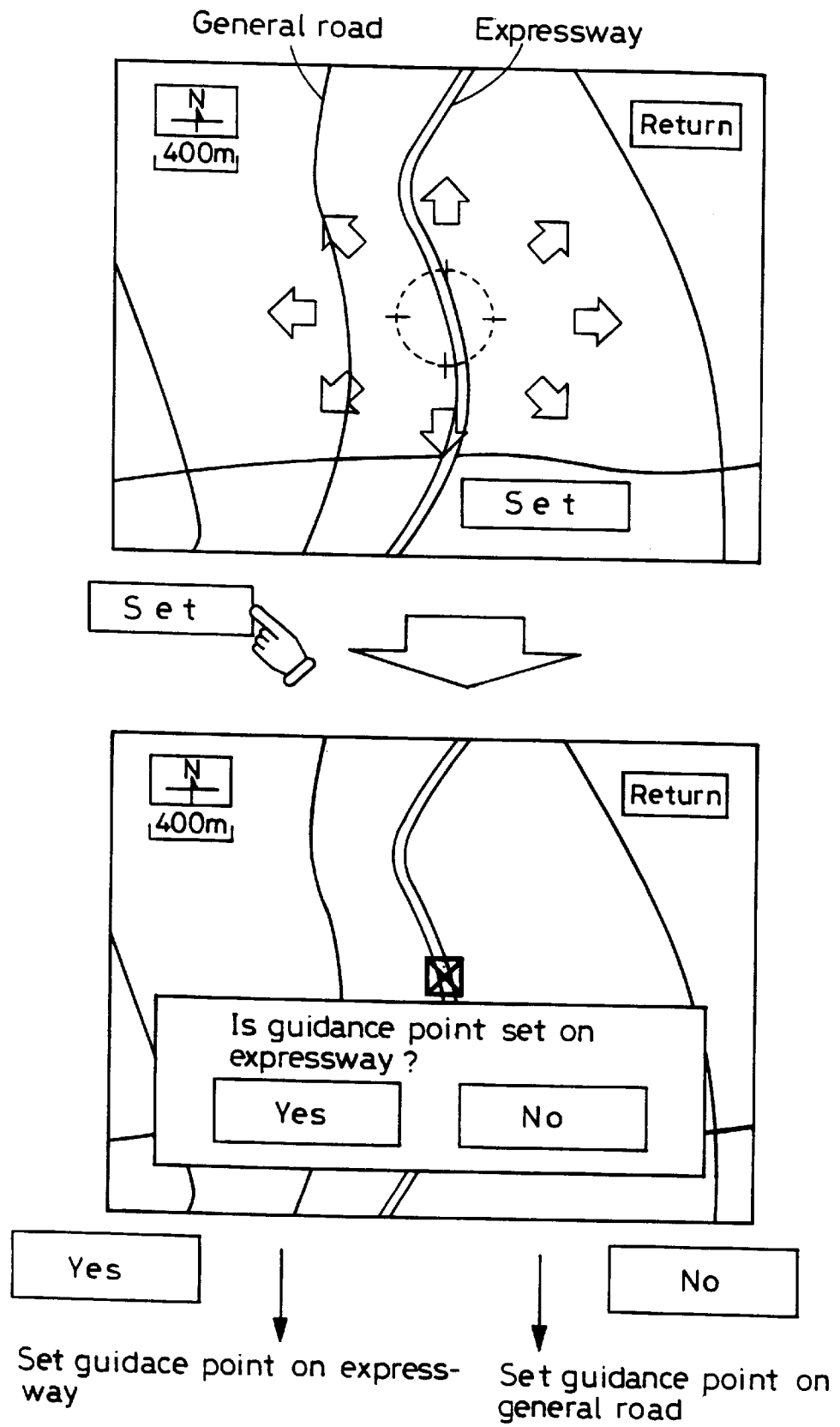
FIG. 40 illustrates one example of a guidance point set on an expressway.

FIG. 40 illustrates a specific case where the guidance point is set on an expressway. With the cursor mark positioned on the expressway, a set key is pressed so that a guidance point condition setting screen this screen On this screen, it is designated whether the guidance point is to be set on the expressway. When "set" is selected, the guidance point is set on the expressway whereas when "not set" is selected, the guidance point is set on a general road.

This invention is not limited to the aforesaid specific embodiments and may be carried out even when it is modified as follows.

Figure 28:
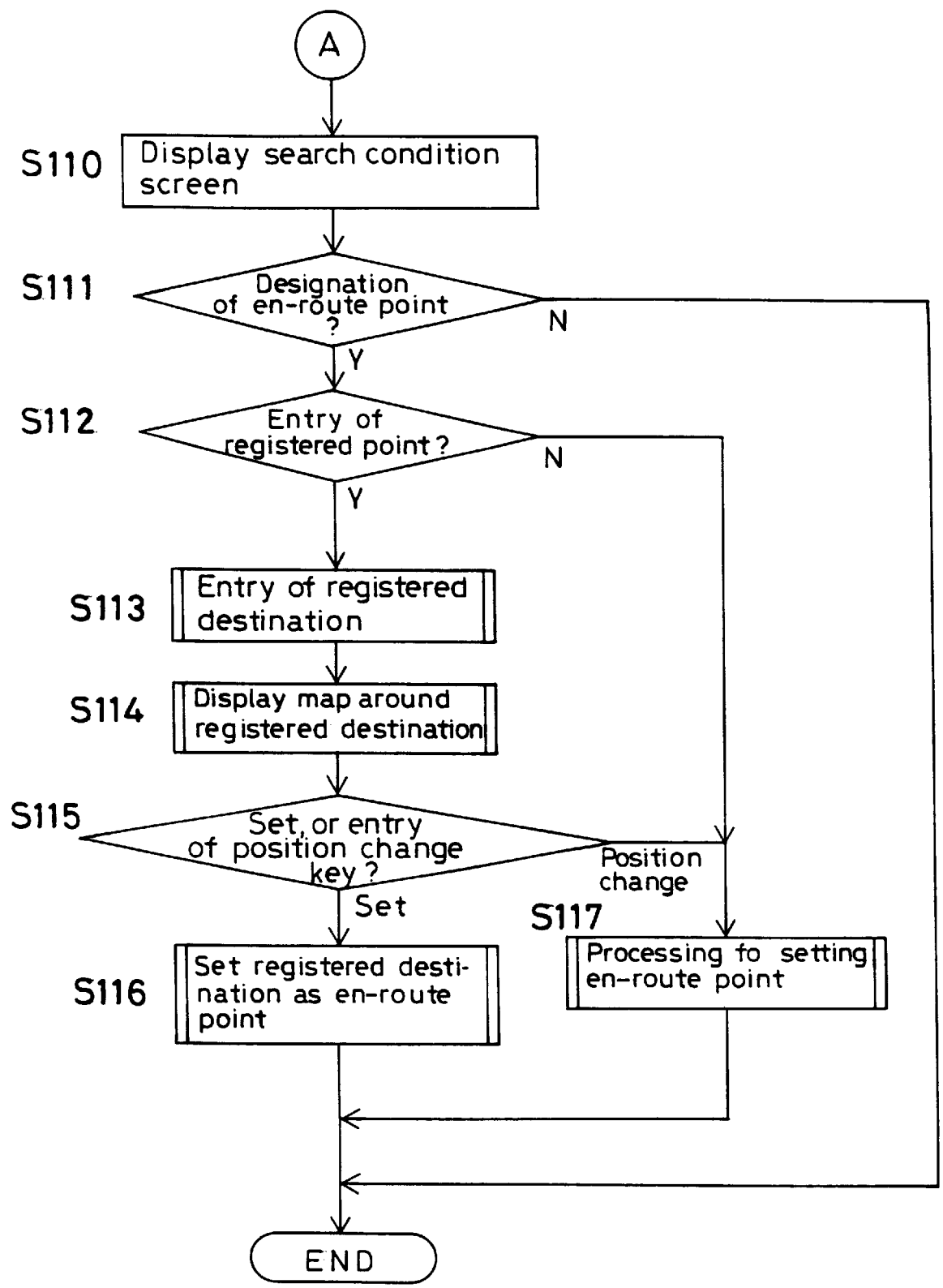
FIG. 28 is a flow diagram following the flow diagram of FIG. 27.

(1) For instance, the screens shown in FIGS. 25 and 28, used to set the transit point condition, may be modified such that the selected road is displayed in enhanced fashion, e.g., in different colors or in blinking modes, thereby enabling the selected road to be more easily visible.

Figure 41:
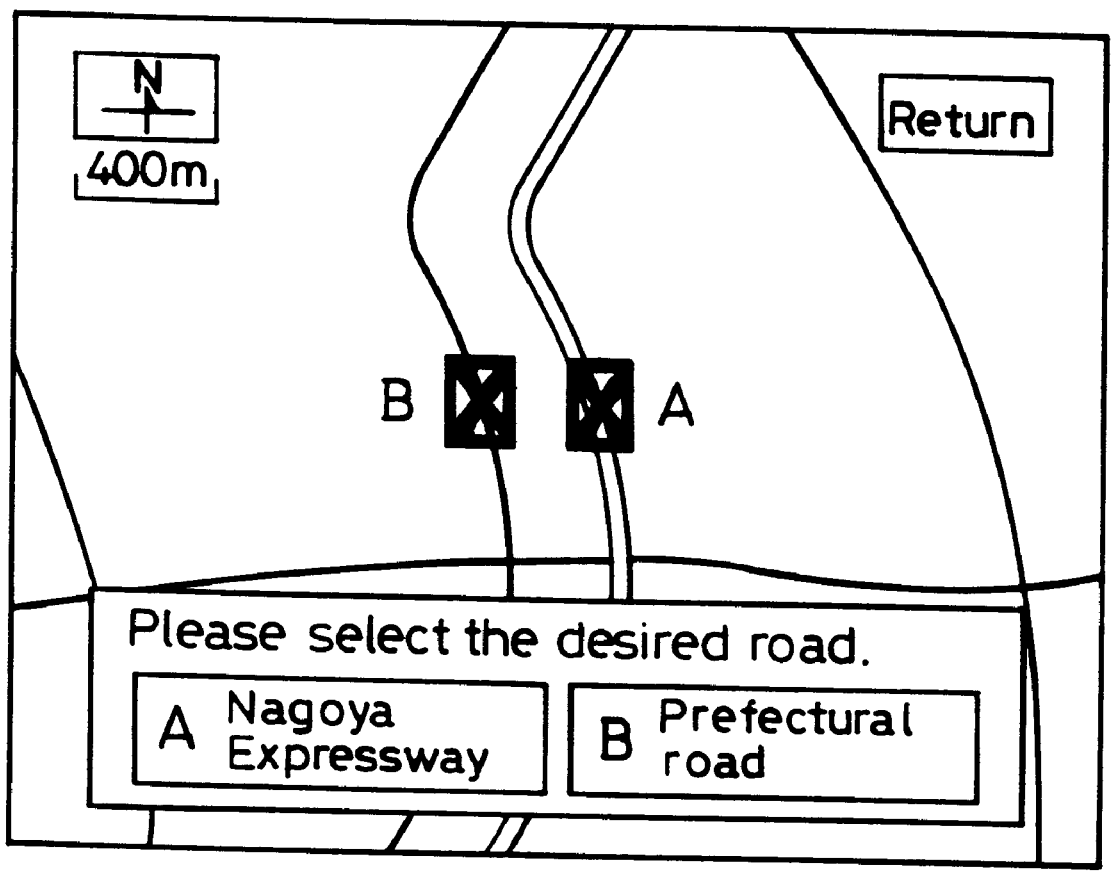
FIG. 41 illustrates one example of displaying provisional setting marks A and B for all fetched roads.

(2) As shown in FIG. 41, provisional marks A and B are displayed for each extracted road to render it easier for the user to make a selection from them. This enables the user to have an easy understanding of position information when the transition point is set.

(3) In the specific embodiments explained above, a road is selected for an entered point, for instance, and a point on the selected road that is nearest to the entered point is determined as the transit point. Unable to select this nearest point are various methods inclusive of a method of making a selection from any desired points (in pixel units) on the road, and a method of selecting the nearest node using the node data within a collection of guidance road data as shown in FIGS. 12A–12E.

(4) Road data on the selected road may be acquired under predetermined conditions. For instance, data of a road lying within a given distance from an entered point may be acquired to perform a search based upon the thus acquired road data. This search, for instance, may be performed such that all the road data acquired may be encompassed.

(5) Roads to be retrieved relative to an entered point may lie not only within a circular area around the entered point but also within a rectangular area with respect to the entered point. Alternatively, if map data is loaded in memory while it is divided into rectangular regions (i.e., while the map data is divided in mesh forms for each scale), then an area containing the entered point may be retrieved.

What we claim is:

1. A navigation system for a vehicle, comprising:

present-position sensing means for sensing a present position of the vehicle;

information storage means for storing map information;

destination setting means for setting a destination;

roundabout point setting means for setting a roundabout point as an unwanted point;

route searching means for searching for a route from the present position to the destination based upon the map information stored in the information storage means; and guidance means for guiding the vehicle along a route calculated by the route searching means, wherein the route searching means includes cost changing means for changing the searching cost to search for a route passing through the roundabout point as the unwanted point to a higher cost, so that a route to the destination having a lowest searching cost is searched based on the searching cost changed by the cost changing means.

2. The navigation system according to claim 1, wherein the roundabout point setting means registers the set roundabout position therein, and the route searching means is such that a search cost for a route passing through the registered roundabout point is made so high for each route search that a route to the destination can be searched for, the route having a lowest search cost.

3. The navigation system according to claim 1, wherein the roundabout point setting means includes bypass setting means for setting the roundabout point and an approach direction toward the roundabout point, thereby setting a bypass based on the map information, and the route searching means is such that a search cost for the bypass is made so high that a route to the destination can be searched for, the route having a lowest search cost.

4. The navigation system according to claim 1, wherein the navigation system further includes roundabout information setting means for setting a bypass or roundabout intersection based on the roundabout point and the map information, and the route searching means is such that a search cost for a road whose starting or terminating point is defined by the bypass or the roundabout intersection is made so high that a route to the destination can be searched for, the route having a lowest search cost.

5. The navigation system according to claim 4, wherein the roundabout information setting means retrieves roads lying within a prescribed range from the roundabout point to set a roundabout intersection.

6. The navigation system according to claim 4, wherein the roundabout information setting means retrieves roads lying within a prescribed range from the roundabout point to set a bypass.

7. The navigation system according to claim 6, wherein the roundabout information setting means registers the set bypass or intersection therein.

8. The navigation system according to claim 5, wherein the roundabout information setting means registers the set bypass or intersection therein.

9. The navigation system according to claim 1, wherein the guidance means is such that when the present position approaches the roundabout point, a warning sound is generated to inform a driver of the vehicle that the roundabout point is being reached.

10. A navigation system for a vehicle, comprising:
present-position sensing means for sensing a present position of the vehicle;
information storage means for storing map information;
destination setting means for setting a destination;
bypass setting means for setting a bypass as an unwanted road;
route searching means for searching for a route from the present position to the destination based upon the map information stored in the information storage means; and
guidance means for guiding the vehicle along a route calculated by the route searching means,
wherein the route searching means includes cost changing means for changing the searching cost to a higher cost by setting the bypass as the unwanted road, so that a route to the destination having a lowest search cost is searched based on the cost changed by the cost changing means.

11. A navigation system for a vehicle which gives guidance based on a route searched for a set destination, comprising:
destination setting means for setting the destination;
location setting means for setting a location desired to be traversed; and
route searching means for searching for a route which gives guidance based on the set destination and/or the set location desired to be traversed, the location setting means for setting the location desired to be traversed comprising:
location input means for entering the location desired to be traversed;
road retrieval means for retrieving roads lying within a prescribed range with respect to the location desired to be traversed, based on the location desired to be traversed, which has been entered by the location input means;
condition setting means for setting a condition for the location desired to be traversed so that the location desired to be traversed entered by the location setting means for setting the location desired to be traversed is set with respect to roads retrieved by the road retrieval means; and
road selecting means for offering a selection from the roads retrieved on the basis of the condition for the location desired to be traversed by the condition setting means, so that a point on a road selected by the road selecting means can be set as the location desired to be traversed.

12. The navigation system according to claim 11, wherein a range for retrieving roads by the road retrieval means lies within a prescribed distance starting from said location to be traversed.

13. The navigation system according to claim 11, wherein the location setting means for setting the location desired to be traversed has a function such that when any location desired to be traversed is not found on the road selected by the road selecting means, the location desired to be traversed is forcibly transferred onto a position nearest to the road.

14. The navigation system according to claim 11, wherein the road selecting means has a function capable of presetting a selecting condition where there are a plurality of roads belonging to different categories, thereby making it possible to select a road from the retrieved roads, on which the location desired to be traversed is set on the basis of the present selection condition.

15. The navigation system according to claim 11, wherein the road selecting means makes it possible to select from all the roads retrieved by the road retrieval means a road on which the location desired to be traversed is set.

16. A navigation system for a vehicle for performing route guidance with a map and a present-position mark displayed on a screen, comprising:
present-position sensing means for sensing a present position of the vehicle;
information storage means having map information enabling the map to be displayed on the screen for route guidance and other route information loaded into memory;
display means for displaying a map for route guidance and the present-position mark; and
route guidance means for accepting the present position and direction of travel of the vehicle from a detection signal from the present-position sensing means, so that the map information can be read out of the information storage means to display the map and the present-position mark of the vehicle on the display means, and for switching over a display of said present-position mark from a continuous mode to a blinking mode or from the blinking mode to the continuous mode depending on a change in a state where the vehicle is displayed on the map.

17. The navigation system according to claim 16, wherein the route guidance means is designed such that when the vehicle is at a stop, the present-position mark is displayed in a blinking mode, and when the vehicle is in motion, the present-position mark is switched over from the blinking display mode to a continuous display mode.

18. The navigation system according to claim 16, wherein the route guidance means is designed such that when a magnification of the map being displayed is larger than a given magnification, the present-position mark is displayed in the continuous mode, and when the magnification of the map being displayed is lower than the given magnification, a display of the present-position mark is switched over to the blinking mode.

19. The navigation system according to claim 16, wherein the route guidance means is designed such that as a speed of the vehicle sensed by the present-position sensing means increases, a period of blinking display increases, and upon the speed of the vehicle exceeding a given value, the present-position mark is switched over from a blinking display mode to a continuous display mode.

20. The navigation system according to claim 16, wherein the route guidance means judges whether the present position lies within a given range from an intersection, and when the present position is not found within said given range, said present-position mark is displayed in the blinking mode and when the present position is found within the given range, the present-position mark is switched over from a blinking display mode to a continuous display mode.

* * * * *